United States Patent
Brown

(10) Patent No.: US 10,253,959 B2
(45) Date of Patent: Apr. 9, 2019

(54) RETROFIT AND NEW LIGHT-EMITTING DIODE (LED) LIGHT FIXTURES FOR REPLACEMENT OF A FLUORESCENT LIGHT FIXTURE

(71) Applicant: Flow Lighting, LLC, Grapevine, TX (US)

(72) Inventor: Gregory A. M. Brown, Incline Village, NV (US)

(73) Assignee: Flow Lighting Technologies, Inc., Grapevine, TX (US)

( * ) Notice: Subject to any disclaimer, the term of this patent is extended or adjusted under 35 U.S.C. 154(b) by 438 days.

(21) Appl. No.: 14/893,335

(22) PCT Filed: May 12, 2014

(86) PCT No.: PCT/US2014/037651
§ 371 (c)(1),
(2) Date: Nov. 23, 2015

(87) PCT Pub. No.: WO2014/189700
PCT Pub. Date: Nov. 27, 2014

(65) Prior Publication Data
US 2016/0138789 A1    May 19, 2016

Related U.S. Application Data

(60) Provisional application No. 61/855,839, filed on May 23, 2013, provisional application No. 61/860,494, (Continued)

(51) Int. Cl.
*F21V 21/14* (2006.01)
*F21V 21/04* (2006.01)
(Continued)

(52) U.S. Cl.
CPC .............. *F21V 21/04* (2013.01); *F21S 8/026* (2013.01); *F21V 15/01* (2013.01); *F21V 23/02* (2013.01);
(Continued)

(58) Field of Classification Search
CPC .......... F21V 21/04; F21V 15/01; F21V 23/02; F21V 23/0442; F21V 23/045; F21V 23/0471; F21S 8/026; H05B 37/0245
(Continued)

(56) References Cited

U.S. PATENT DOCUMENTS 4,429,354 A    1/1984  Garnett ......................... 362/342
5,024,474 A    6/1991  Selby ............................ 292/252
(Continued)

FOREIGN PATENT DOCUMENTS

| EP | 2194313 | 6/2010 |
| JP | H07272509 | 10/1995 |
| WO | WO 2012/147707 | 11/2012 |

OTHER PUBLICATIONS

International Search Report and Written Opinion issued in PCT/US14/37651, dated Nov. 14, 2014.
(Continued)

*Primary Examiner* — Anh T Mai
*Assistant Examiner* — Jessica M Apenteng
(74) *Attorney, Agent, or Firm* — Snell & Wilmer L.L.P.

(57) ABSTRACT

This disclosure includes kits for retrofitting, or replacing with new, light fixtures using an existing troffer, without using a troffer, and/or including a troffer. Some kits include a frame for a light fixture having a first end, a second end, and a frame length extending between the ends, a first mounting member coupled to the frame and configured to extend beyond the first end of the frame, and a second mounting member coupled to the frame and configured to
(Continued)

extend beyond the second end of the frame, where the mounting members are configured to support the frame relative to the troffer. Others of the present kits have a trim configured to support the frame relative to a T-bar support of a suspended ceiling. Some kits have a processor configured to control the light fixtures, and some kits have one or more sensors configured to detect events or environmental characteristics.

19 Claims, 21 Drawing Sheets

Related U.S. Application Data filed on Jul. 31, 2013, provisional application No. 61/947,233, filed on Mar. 3, 2014.

(51) Int. Cl.

| | |
|---|---|
| *F21V 15/01* | (2006.01) |
| *F21V 23/04* | (2006.01) |
| *F21S 8/02* | (2006.01) |
| *H05B 37/02* | (2006.01) |
| *F21V 23/02* | (2006.01) |
| *F21Y 115/10* | (2016.01) |

(52) U.S. Cl.
CPC ........ *F21V 23/045* (2013.01); *F21V 23/0442* (2013.01); *F21V 23/0471* (2013.01); *H05B 37/0245* (2013.01); *F21Y 2115/10* (2016.08); *Y02B 20/386* (2013.01)

(58) Field of Classification Search
USPC .......................................................... 362/95
See application file for complete search history.

(56) References Cited

U.S. PATENT DOCUMENTS

| | | | |
|---|---|---|---|
| 5,161,878 A | 11/1992 | Degelmann et al. ......... 362/150 |
| 5,226,719 A | 7/1993 | Feldpausch et al. ......... 362/133 |
| 5,366,203 A | 11/1994 | Huffman ...................... 254/362 |
| 5,806,972 A | 9/1998 | Kaiser et al. ................. 362/290 |
| 6,059,424 A | 5/2000 | Kotloff ......................... 362/220 |
| 2003/0031011 A1 | 2/2003 | Miller et al. .................. 362/150 |
| 2010/0085767 A1 | 4/2010 | Boyer et al. .................. 362/368 |
| 2010/0091484 A1 | 4/2010 | Mayfield |
| 2010/0149791 A1 | 6/2010 | McCane et al. .............. 362/147 |
| 2010/0188845 A1* | 7/2010 | Rooms ..................... F21S 8/02 362/191 |
| 2010/0296285 A1* | 11/2010 | Chemel .................. F21S 2/005 362/235 |
| 2011/0121654 A1* | 5/2011 | Recker .................... H02J 9/065 307/66 |
| 2011/0141743 A1 | 6/2011 | Fabbri ...................... 362/296.01 |
| 2012/0044350 A1* | 2/2012 | Verfuerth .......... H05B 37/0272 348/143 |
| 2013/0044512 A1 | 2/2013 | Araki et al. .................. 362/607 |

OTHER PUBLICATIONS

International Preliminary Report on Patentability issued in PCT/US14/37651, dated Dec. 18, 2015.
Pct; National Stage; Mexican Office Action dated Aug. 9, 2018 in the Mexican Patent Application No. MX/a/2015/016133.

* cited by examiner

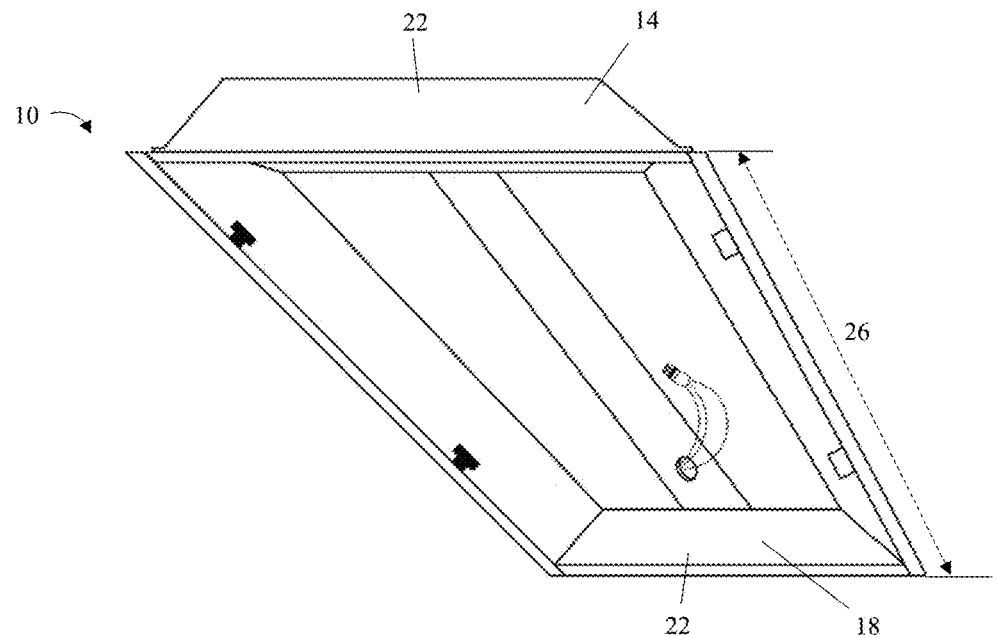
FIG. 1 – Prior Art
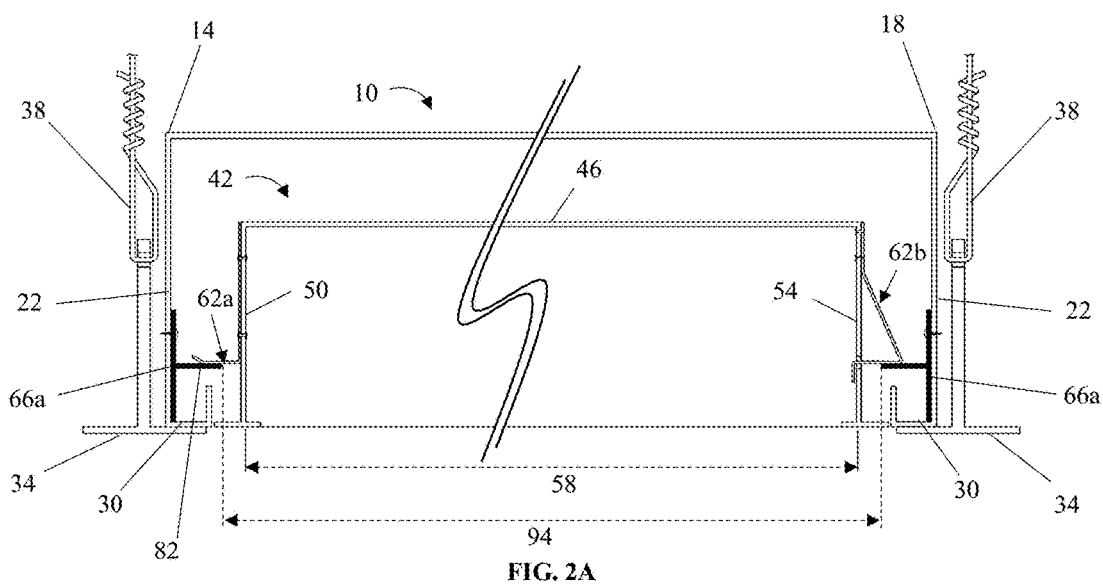
FIG. 2A

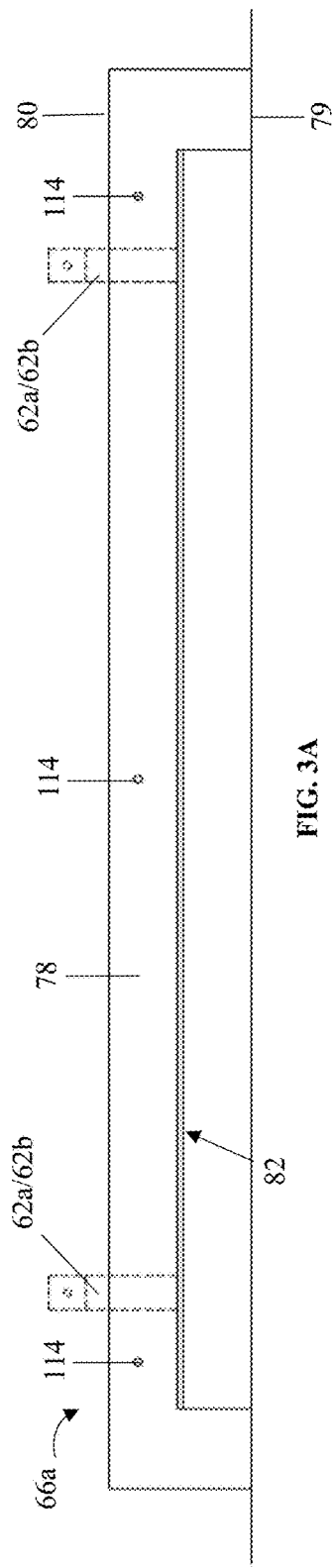
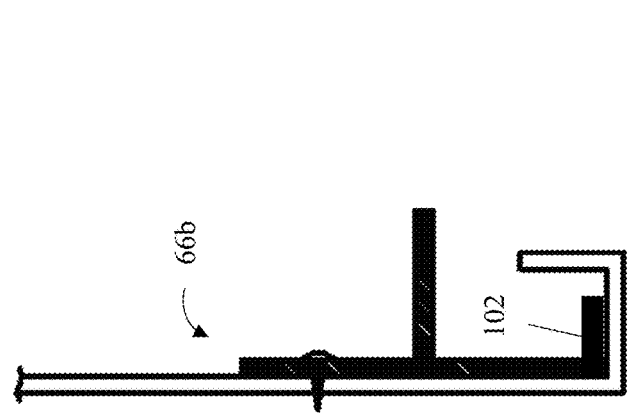
FIG. 3A
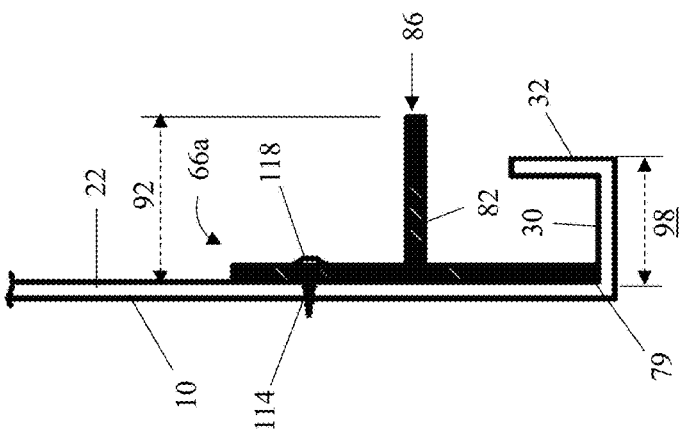
FIG. 3B
FIG. 3C

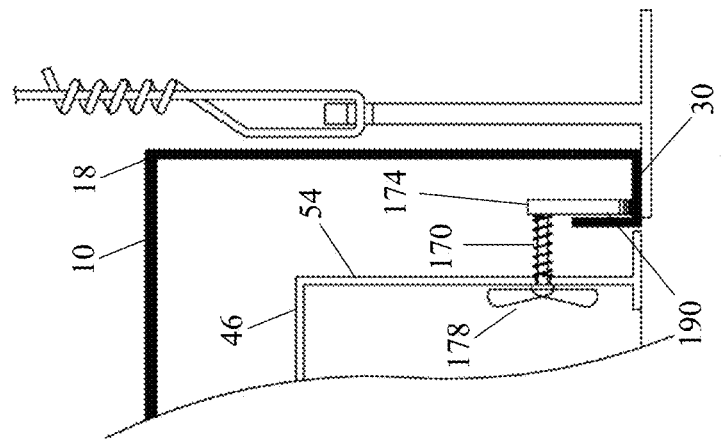
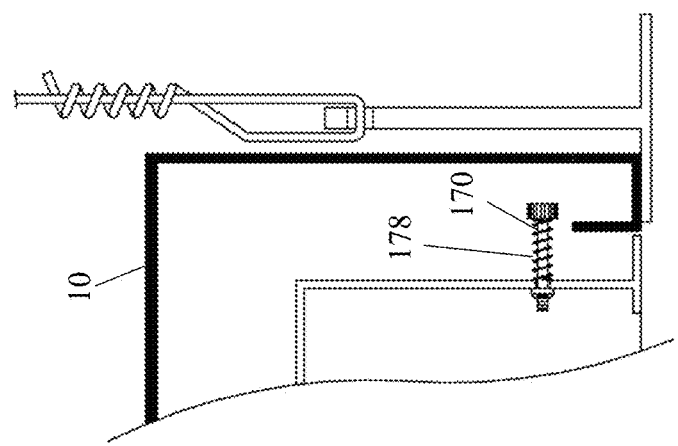
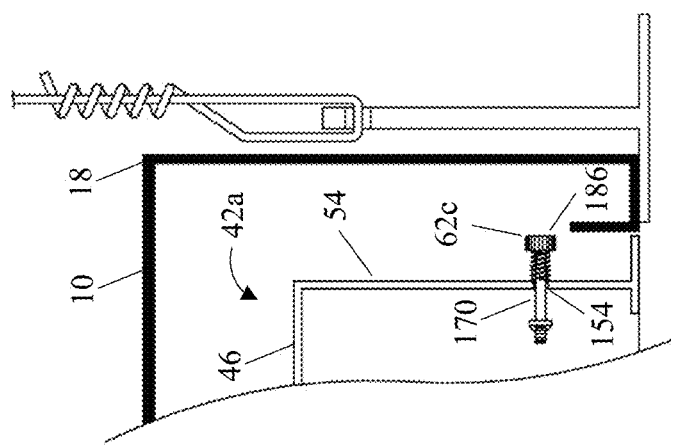

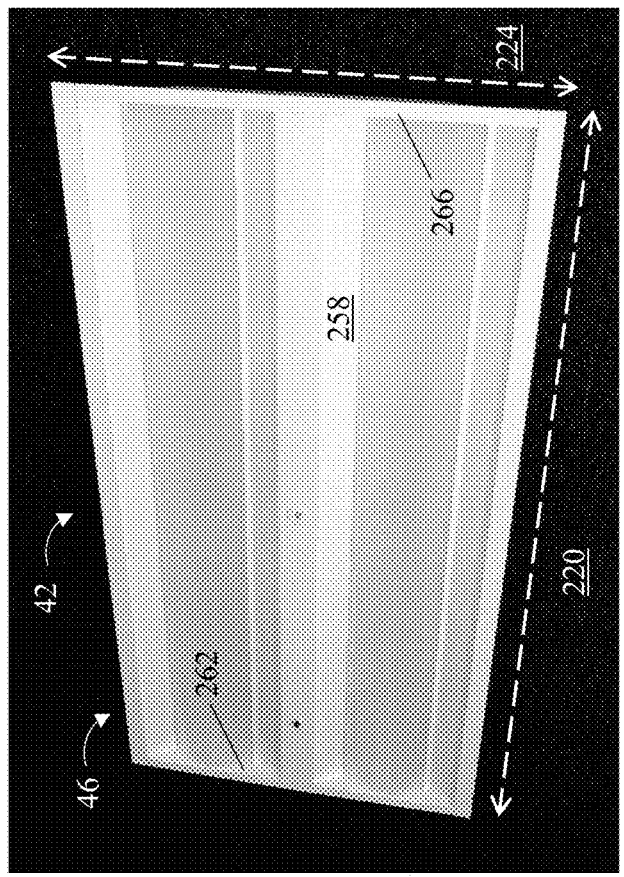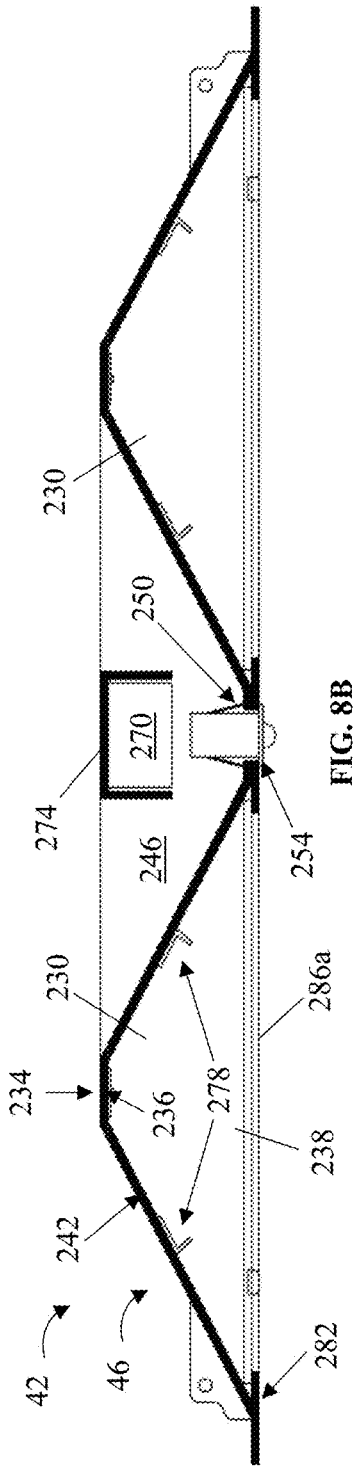
FIG. 8A
FIG. 8B

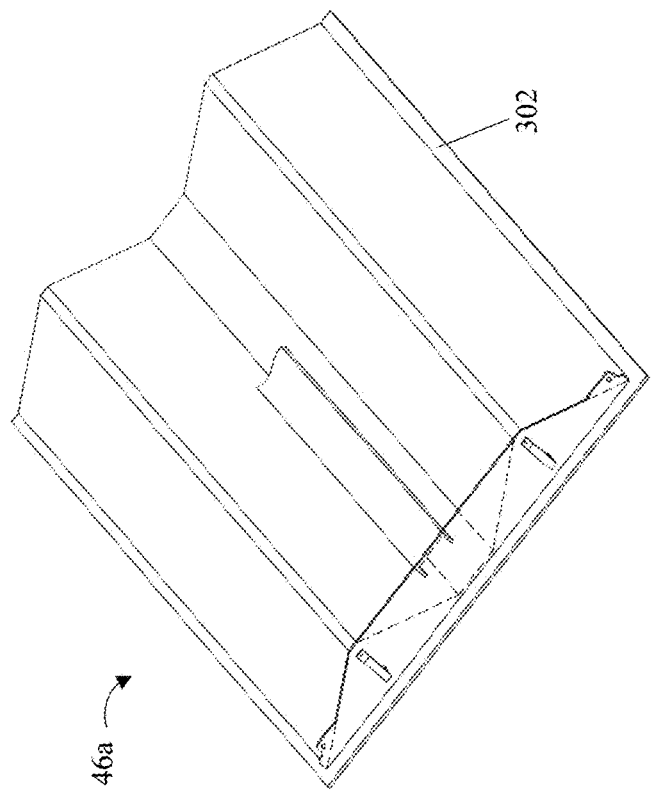
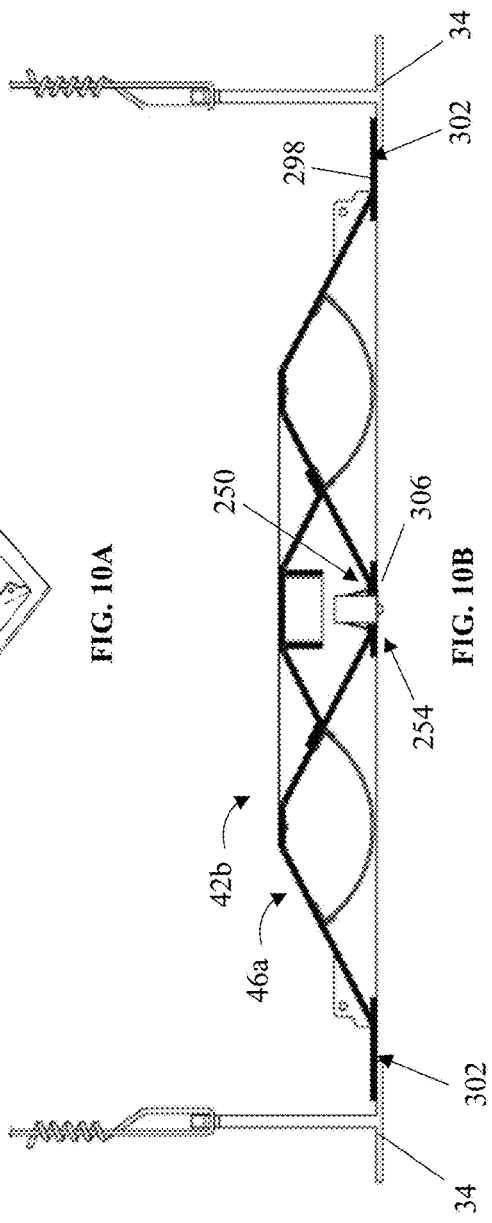
FIG. 10A
FIG. 10B

PARTIAL FLOOR / BUILDING SECTION

FLOOR / CEILING PLAN VIEW

RETROFIT AND NEW LIGHT-EMITTING DIODE (LED) LIGHT FIXTURES FOR REPLACEMENT OF A FLUORESCENT LIGHT FIXTURE

PRIORITY CLAIM

This application claims priority to: (1) U.S. Provisional Patent Application No. 61/947,233 filed Mar. 3, 2014; (2) U.S. Provisional Patent Application No. 61/860,494 filed Jul. 31, 2013; and U.S. Provisional Patent Application No. 61/855,839 filed May 23, 2013; the contents of all three of these applications are incorporated by reference in their entireties.

FIELD OF INVENTION

The present invention is generally related to light fixtures and more particularly, but not by way of limitation, to retrofit and new light fixtures (e.g., light-emitting-diode (LED) light fixtures) for replacement of traditional fluorescent light fixtures.

BACKGROUND

There are billions of fluorescent light fixtures throughout the U.S. and the world. Most energy costs for lighting are generated in office and commercial space, which primarily utilize fluorescent light fixtures. It is estimated that commercial lighting demand consumes up to 25% of the total energy consumed in the U.S. alone. In addition, the Department of Energy (DOE) estimated in 2010 that linear fluorescent lighting represents the overall highest electricity consumer at 42 percent of energy used for lighting. With almost 15 billion square feet of office space in the U.S. alone this market is enormous. The DOE 2010 U.S. Lighting Market Characterization report estimates that 81.2 billion square feet in Commercial Building space that contains over 2.1 billion light fixtures in commercial buildings with 71.8% of commercial fixtures being linear fluorescent fixtures. This translates to more than 1.5 billion linear fluorescent fixtures in the U.S. in commercial buildings alone.

The commercial light fixture market has been predominantly standardized to 2×4 (2 foot×4 foot) recessed fixtures, which are typically installed in suspended grid ceiling systems. In addition to the overwhelming number of 2×4 fixtures there are also 2×2 and 1×4 fixtures and while most are recessed (or mounted on suspended grid ceiling systems)—some are surface mounted fixtures and still fewer are mounted in other ways. The change from fluorescent to LED that has already started is tantamount to when fluorescent lighting replaced incandescent lighting in commercial and industrial spaces.

Fluorescent fixtures have improved over the years for better efficiency and reduced energy consumption through the use of better ballasts and lamping modifications (T12, T8, T5, etc.). In addition various lens modifications have been designed over the years to reduce glare or improve light distribution, but they did not typically provide notable energy savings. Some fixtures and lamp types can be retrofitted with a dimming ballast—a key feature in reduction of energy consumption, however most fluorescent fixtures cannot be made dimmable. In more recent years dimming ballasts have been added to some fluorescent lamped fixtures—the most common commercial lamps deployed. However, these dimming ballasts are both expensive to purchase and install and they can dramatically reduce lamp life and ballast life, which increases the life cycle cost of the fixtures offsetting energy savings and reducing the incentive to upgrade the fixtures. The upgrades and modifications to fluorescent fixtures, lamps, ballasts and other components have largely been incentivized over the years with rebates, tax credits and other incentives which have covered much if not all of the costs for improvements to these fixtures to promote energy reduction. Likewise, numerous grants, rebates, and tax credits and other incentives are available to implement a retrofit from fluorescent to LED systems.

Commercial light fixtures typically function in banks or zones of lights within an office or commercial space and large numbers of lights may be ganged or interconnected and wired to one switch to reduce the number of switches, costs and complexity. Therefore, these light fixtures cannot be controlled individually or even effectively in smaller groups. A light switch or control system will govern specific banks of light fixtures or zones within an occupied space and these zones are highly inefficient in the use of energy for lighting since the controls apply to so many fixtures and lack flexibility. For example, an entire zone or bank of light fixtures on a given floor may be configured to illuminate the space for up to 50 employees or more. All these fixtures would typically be turned on during business hours and even after business hours, with every fixture consuming energy, even if only one or only a few employees were actually occupying various spaces within the larger illuminated zone. Even if occupancy sensors are applied to a given office or open office area as defined above—the sensor(s) typically control the same bank of lights controlled by the light switches which typically includes dozens of fixtures and not individual fixtures. Once again—the fluorescent systems do not typically dim so the entire field of lights is either on or off and not optimized. In certain applications, dual ballasts can be installed and dual switches for stepped dimming (e.g., either 50% or 100% dimming) can be used, however, such applications are generally not optimized.

There are also a number of inherent drawbacks in the current commercial light fixture offerings. The vast majority of these most common fluorescent lights contain fluorescent lamps, ballast and sockets with a housing (troffer) and a lens. For example, these fixtures contain hazardous materials—the fluorescent lamps contain mercury, which is highly toxic, and the vast majority of the original ballasts contained PCB—another very hazardous material. While many of these ballasts and/or fixtures have been replaced—many still exist in the field and as they age the odds of these units leaking PCB increases. Additionally, the light fixtures typically cannot be dimmed to reduce energy consumption. When fixtures are modified to accept dimmers they often reduce lamp and ballast life increasing life cycle costs—in addition to the cost of adding the dimmers. Even if dimmers are added they are typically not controlling individual fixtures, but rather large interconnected banks or groups of fixtures that must all be dimmed to the same levels regardless of illumination needs in smaller zones within the switched area. Many of these fixtures are ganged on switches so they cannot be individually controlled in large installations and are typically switched in large banks or zones requiring all the lights in a zone to be turned on—even if only one workspace is actually occupied. Where new technology has been applied to existing or new light fixture installations such as sensors and controllers they are installed in very limited ways to control fixtures in large banks within an installation but they do not provide for individual controls of a fixture within a large installation and none are configured and capable of working as a series of fixtures and components within a larger networked system to optimize every fixture. Existing retrofit kits for fluorescent fixtures generally require either a) labor intensive on-site assembly of all of the components needed for LED lighting systems inside an existing light fixture housing or troffer using double stick tape or clips and then re-use of the existing lens, which is not optimized for the new lamping; or b) another labor intensive effort in the replacement of existing components with some pre-assembled components (typically 3-6 components) that require field assembly of the components overhead; or c) the complete replacement of the existing light fixtures with new light fixtures which requires removal of all or most of the ceiling tiles, significant disruption to the occupants and function of the space, removal of the existing fixtures, installation of the new fixtures with multiple seismic ties from each new fixture to the structure above and clips for the new fixture to fasten it to the grid ceiling system as well and then re-installation of all the ceiling tiles and replacement of those damaged in the process. Additionally, often times existing lenses, which are typically re-used in these replacement efforts, are not optimized for the new light systems. Many existing lenses can be cracked, discolored, and inefficient and can reduce lighting performance by as much as 50%—diminishing the performance of the new retrofit assembly and the energy savings expected.

SUMMARY

Some of the present embodiments include high efficiency light fixtures in quick conversion kits, some with optional integrated sensors, logic and processing capabilities, controls and/or wireless communication systems that allow each light fixture to act autonomously and/or as an integrated networked system to optimize lighting conditions and reduce energy consumption. In addition, the fixtures can assist in notifying occupants of emergency conditions and guiding occupants to safe exits with optional integration of alarm systems, emergency services and/or through the use of sensors in one or any of the networked fixtures. Some of the present fixtures, for example, can both notify and guide occupants to safe exits with strobe warnings to evacuate a facility. Sequenced flashing lights moving in the direction of safe exits and flashing green lights can mark safe exits as well as a multitude of other programmable or sensor/logic driven options. Some embodiments of the present fixtures and/or systems can also notify emergency services of the exact locations within a facility of fire, collapse, trapped occupants or other emergency conditions.

Individual ones of the present fixtures used in conjunction with other similar fixtures can form a network of integrated sensors and controls that can function as a comprehensive integrated system that can operate autonomously, and/or by programmed response, integrated with various software and control applications, as a network of fixtures and sensors working together at various levels from individual, subgroup, group, master and slave, or any other hierarchy of control. The levels of control and energy management for the networked lighting systems can range from the individual light fixture, to certain fixtures with specific lighting functions, to a space being illuminated by a series of light fixtures, to an entire floor in a building, to an entire building, to a campus or group buildings out to an entire community and beyond.

The present fixtures can include a lens or lenses, sensors, logic and processing capabilities, controls, communication systems, and/or other components or systems within a universal light fixture assembly or kit. Pre-assembled ones of the present fixtures can contain all the necessary components needed for the functions defined herein. The present kits can be universal (e.g., adjustable), and/or kit can easily and safely replace existing less efficient light fixtures with a complete pre-assembled retrofit lens and light system in a fixture kit that can fit into any existing manufacturer's already installed light fixture housing or troffer.

Some of the present fixtures may not require wall switches or associated wiring. In some embodiments wireless and/or wired switch(es) (e.g., low voltage, digital, and/or the like) switches can be provided (e.g., if required by code or otherwise desired).

At least some of the present kits can also provide manufacturers of less-efficient fixtures with a means of implementing a universal integrated fixture assembly into their existing or newly configured housing or troffer designs to sell as a new product line(s) and a more efficient assembly than they currently manufacture and can be accomplished without the need to retool or delay sales opportunities. It can also be manufactured as a standalone new fixture in a variety of sizes and installation options including but not limited to recessed, surface mounted, and other methods.

Some configurations can include the integrated sensors, controls, logic and processing capabilities and/or communication systems packaged as a stand-alone kit (optionally provided without light systems, lens and associated assemblies) to be added to existing installed or new light fixtures as a kit or in components to create better lighting environments, lower energy consumption and add features and functions and/or improve energy management controls for the networked fixtures.

Some of the present light fixtures and optional associated sensors, logic and processing capabilities, controls and communication systems can permit a tenant, building owner and/or operator, campus, community, or others to reduce energy consumption while optimizing illumination and to achieve many other heretofore-unachievable feats.

Some of the present fixtures and/or kits can be configured in one or more of each of the configurations below which can include a variety of features, functional levels, and/or options, such as, for example, with or without sensors, logic and processing systems, controllers, communication or other equipment and/or any combination thereof. For example, a fixture can be configured and installed or sold as: 1) a universal quick-change retrofit kit with high-efficiency light source(s) (e.g., LEDs) that can quickly and cost effectively change a lower performing fixture to a higher performing fixture; 2) a universal quick-change retrofit kit with high-efficiency light source(s) (e.g., LEDs) with on-board sensors, controls, logic, and processing capabilities, that can function as an autonomous fixture and/or as part of a group of fixtures; 3) a universal quick-change retrofit kit with high efficiency light source(s) (e.g., LEDs) with sensors, controls, logic, and processing capabilities, and wired and/or wireless communications systems which can act autonomously, as part of a group of fixtures, and/or as a broader system (e.g., network) of fixtures with on-board sensors, controls, and/or with software generated input from off-board (e.g., off-fixture) systems; 4) as a new fixture in various sizes for recessed, surface mounted, and other applications with or without the described sensors, controls, logic and processing capabilities, and/or communication systems; 5) as an OEM fixture that may be quickly be added to an existing manufacturer's troffer assemblies during production and, for example, provide a new product series with a wide range of optional functions with or without the described sensors, controls, logic and processing capabilities, and/or communication systems; and/or 6) configured as a sensor, computing unit (e.g., for logic and processing), controller, communications device or as an assembly of sensors, components with logic and processing capabilities, controllers, and/or communications kits to add to new or existing fixtures for improved illumination and reduced energy consumption.

The present fixtures or kit can act as: 1) a simple replacement fixture; or 2) as an autonomous fixture controlling its own systems and requirements; and/or 3) as an element within a network of smart light fixtures with or without external control applications and can provide numerous levels of lighting features and functions. Some of these lighting conditions include, for example: 1) General Lighting; 2) Exit/Egress Lighting; 3) Night Light functions; 4) Emergency Condition functions and others as conceived and programmed since the immense flexibility of the system is a key element in the value the system offers users. Each fixture is uniquely programmable and various fixtures can be assembled into any sub-group, group or other hierarchy imaginable and programmed, which can all be accomplished through wireless systems.

Some embodiments of the present fixtures include fully integrated sensors, logic and processing capabilities, dimmers, controls, communication systems and/or other components or systems required to achieve the functions described. These integrated systems provide the ability for each individual fixture to communicate with each other and/or a series of other remote controllers, applications, appliances, devices or other suitable means. Such embodiments can self-regulate lighting output and energy consumption and communicate with both adjacent fixtures and/or function as part of a larger "smart" lighting system within in a given installation or network(s).

Sensors may include, for example, occupancy, thermal, photocell, laser, temperature, optical, acoustic, seismic, acceleration, infrared and any number of other sensors deemed useful in the control of the individual light fixture and/or the system of lights to which it is integrated. Such sensors can also detect data that can also or alternatively be used for other control systems, such as, for example, that control window blinds, air conditioning systems, power at controlled outlets, and other functions that manage energy consumption in buildings.

The present fixtures can include reduced energy consumption lamps (LED, or other types) as well as integrated sensors (occupancy, motion, photocell, and/or others as applicable) with logic and processing capabilities (internal and/or external), dimmers and other control features which may include color temperature (degrees kelvin), visible light color selections controller, either hard-wired or wireless sensors and communication systems and controls as well as an optional integrated (and/or remote) overall master control application(s) and monitoring and/or metering system(s) for the network that can be controlled at various levels from an individual fixture or specific fixtures, to a space or spaces, a given floor in a building, the entire building, a campus or group of buildings, out to the entire community or beyond. Examples of such control applications can include, by example and without limitation, include proprietary applications, 3rd party applications, Energy Management Systems (EMS), Facility Management Systems (FMS), Facility Automation (FA) systems, Lighting Control applications, and others. Such fixtures and even networked fixture controls can be monitored and controlled down to each fixture in the network or in larger groups through wired or wireless systems and over the Internet, from a Cloud environment, hosted server farm, as well using work stations, lap tops, tablets, phones or other suitable communication appliances or devices.

By way of further example, in some embodiments, each individual light fixture can be independently controlled with and/or by its own sensors and controllers and to act autonomously from the balance of the fixtures in a given space to minimize energy consumption. For example—fixtures adjacent to a window or other light source can automatically dim or turn off as natural daylight or other light source(s) provide sufficient light levels for the space. Occupancy, motion, thermal or other sensors can determine where and when the fixture should provide higher or lower lighting levels on a fixture by fixture basis within the network of fixtures.

In addition, entire office suites, building floors or buildings and beyond can be controlled to reduced light output by a given percentage across an entire network of lights. This wireless connectivity allows the system to address "demand response" requirements from local utilities when their peak energy demand is exceeding their capacity to deliver. When a "demand response" signal is issued from a utility, the entire network of lights are to be stepped down to a given maximum percentage of output to reduce energy demand during peak use periods in a given building, campus, community or other network to prevent brownout or black out conditions and/or during emergencies such as after an earthquake. This capability is needed for building owners/managers to obtain certain rebates or incentives as partners with the utility companies. The ability to reduce energy consumption across a network of light fixtures may even become a regulatory requirement in the coming months or years. This new system is capable of providing immediate compliance since it is easily programmed for modifications, features and functions on a wireless basis, which should facilitate access to incentives and rebates to offset the cost of a system. Demand-response functions and compliance are now, or will soon be, a code requirement in some jurisdictions.

In addition, an integrated network of the present fixtures can be used to notify occupants of emergency conditions and assist occupant in exiting a facility by programming certain fixtures to function in specific configurations. Emergency lighting and emergency signals for fire, earthquake, terrorism or other conditions can cause certain fixtures to provide emergency exit lighting, while others provide warning of an emergency condition with a flashing strobe in various colors or other controlled effects. These features and functions, for example, may include integration into building alarm or notification systems such as providing strobe warning lights from certain fixtures, like red flashing lights in the case of a fire, from fixtures around the perimeter of a space warning occupants to exit the building. This can provide augmentation to the fire alarm systems audible enunciators and white strobe warnings. In addition, directional flashing lights that move in sequence toward exits to guide occupants to safe exits and providing a flashing green light to designate an exit door or safe exit passage. Sensors in these fixtures may also detect fire conditions, collapse or other hazards in specific areas of a facility and can signal control systems and emergency responders informing them as to the exact location of fire conditions or collapse. The sensors can detect if an exit or passage is potentially blocked and can re-route and change directional lights guiding occupants out of a building by re-routing them to safe exits and those exit paths that are unsafe or blocked can change from green flashing to orange flashing lights indicating a possible hazard at that exit.

Some embodiments of the present kits are configured, through mounts, mounting members, and/or trim, to retrofit an energy efficient light fixture into an existing troffer. Some embodiments of the present kits are configured, through a processor, one or more sensors (e.g., occupancy, light harvesting, environmental, safety, manual set up and/or the like sensors), and/or a communications device to minimize power requirements, enhance safety, communicate with others of the present kits and/or additional devices such as automated window shades and/or blinds, HVAC systems, power outlets, servers (which may run control programs), users (e.g., through a computer, tablet, and/or cell phone), and/or the like.

Some embodiments of the present kits (e.g., for retrofitting a light fixture into a rectangular troffer with first and second ends each having a vertical wall portion and a lower horizontal shelf portion extending inward from the vertical wall portion toward the other of the first and second ends, inner surfaces of the vertical wall portions separated by a first distance) comprise: a frame for a light fixture, the frame having a first end, a second end, and a frame length extending between the first and second ends; a first mounting member coupled to the frame and configured extend beyond the first end of the frame and be coupled to the first end of the troffer to support the frame relative to the first end of the troffer; and a second mounting member coupled to the frame and configured to extend beyond the second end of the frame and be coupled to the second end of the troffer to support the frame relative to the second end of the troffer.

Some embodiments of the present kits further comprise: two or more mounts, each having a mounting surface and a protrusion extending to an inner end spaced from the mounting surface by a protrusion depth, each mount configured to be coupled to an inner surface of the vertical wall portion of one of the first and second ends of the troffer such that a distance between mounts on opposing ends of the troffer define a mount-opening length that is equal to or less than: the first distance less twice the protrusion depth; where the first mounting member is configured to contact the protrusion of one of the mounts coupled to the first end of the troffer to support the first end of the frame; and where the second mounting member is configured to contact the protrusion of another one of the mounts coupled to the second end of the troffer to support the second end of the frame. In some embodiments, the protrusion depth of each mount is substantially the same or greater than a distance from which the lower horizontal shelf portion of each end of the troffer extends inward from the respective vertical wall portion.

In some embodiments of the present kits, at least a portion of the second mounting member is configured to move between an extended first position and a retracted second position in which a distance between the first end of the frame and a distal end of the second mounting member is less than the mount-opening length. In some embodiments, the second mounting member is biased toward the extended first position. In some embodiments, second mounting member comprises a spring with an upper end fixed to the second end of the frame and a lower end movable relative to the second end of the frame. In some embodiments, the lower end of the spring extends through an end wall of the frame into an interior of the frame such that a user can pull the lower end of the spring toward the first end of the frame to move the second mounting member to the retracted second position. In some embodiments, the spring of the second mounting member has a flat cross-sectional shape.

In some embodiments of the present kits, the first mounting member is coupled in fixed relation to the frame and extends outward from the first end of the frame. In some embodiments, at least a portion of the first mounting member is configured to move between an extended first position and a retracted second position in which a distance between the second end of the frame and a distal end of the first mounting member is less than the mount-opening length. In some embodiments, the first mounting member is biased toward the extended first position. In some embodiments, the first mounting member comprises a spring with an upper end fixed to the first end of the frame and a lower end movable relative to the first end of the frame. In some embodiments, the lower end of the spring extends through an end wall of the frame into an interior of the frame such that a user can pull the lower end of the spring toward the second end of the frame to move the first mounting member to the retracted second position. In some embodiments, the spring of the first mounting member has a flat cross-sectional shape.

In some embodiments of the present kits, the two or more mounts each comprise first planar portion having a lower end and an upper end and defining the mounting surface on a first side between the upper and lower ends, and the protrusion extends outwardly from a second side and defines a shelf spaced from the lower end. In some embodiments, each end of the troffer includes an interior, second vertical wall portion extending upward from an inner end of the respective horizontal shelf portion, and the shelf of each mount is spaced above the lower end of the mount by a distance at least as great as the height of the inner vertical wall portions of the ends of the troffer. In some embodiments, the shelf is spaced from the lower end by a height of between 0.25 inches and 2.5 inches. In some embodiments, the shelf is spaced from the upper end. In some embodiments, each mount defines one or more holes extending through the first portion. In some embodiments, at least one of the one or more holes extends through the first portion between the shelf and the upper end.

In some embodiments of the present kits, the second mounting member includes: a shaft portion slidably and rotatably coupled to the frame such that the shaft portion is movable (between: an extended first position in which the second mounting member extends outward from the second end of the frame, and a retracted second position); and a leg portion extending radially from the shaft portion such that, when the frame is disposed in the troffer with the first mounting member contacting the lower horizontal shelf portion of the first end of the troffer and the shaft portion of the second mounting member is in the extended first position, the shaft portion can be rotated to cause the leg portion to contact the lower horizontal shelf portion of the second end of the troffer to support the second end of the frame. In some embodiments, the shaft portion of the second mounting member is biased toward the extended first position. In some embodiments, when the shaft portion of the second mounting member is in the second position, a length between the first end of the frame and a distal end of the second mounting member is less than the first distance. In some embodiments, the leg portion of the second mounting member defines a cam surface. In some embodiments, the leg portion of the second mounting member extends radially from a rotational axis of the shaft portion by a distance of at least 0.25 inches. In some embodiments, the leg portion of the second mounting member extends radially from a rotational axis of the shaft portion by a distance of between 0.25 and 1.0 inches. In some embodiments, the first mounting member includes a shaft portion and a leg portion, the shaft portion slidably and rotatably coupled to the frame such that the shaft portion is movable between an extended first position in which the first mounting member extends outward from the first end of the frame, and a retracted second position, the leg portion extending radially from the shaft portion such that, when the frame is disposed in the troffer with the first mounting member contacting the lower horizontal shelf portion of the first end of the troffer, the shaft portion of the second mounting member when in the extended first position can be rotated to cause the leg portion to contact the lower horizontal shelf portion of the second end of the troffer. In some embodiments, the shaft portion of the first mounting member is biased toward the extended first position. In some embodiments, when the first mounting member is in the retracted second position, a length between the second end of the frame and a distal end of the first mounting member is less than the first distance. In some embodiments, the leg portion of the first mounting member defines a cam surface. In some embodiments, the leg portion of the first mounting member extends radially from a rotational axis of the shaft portion by a distance of at least 0.25 inches. In some embodiments, the leg portion of the first mounting member extends radially from a rotational axis of the shaft portion by a distance of between 0.25 and 1.0 inches.

In some embodiments of the present kits, the frame has nominal dimensions of 1 foot by 4 feet, 2 feet by 2 feet, or 2 feet by 4 feet. Some embodiments further comprise: one or more safety and/or service cables configured to be coupled to the troffer and to the frame.

In some embodiments of the present kits, the frame defines an inverted channel having a cross-sectional shape that includes an upper end, a lower end that is wider than the upper end, and first and second sides between the upper end and the lower end, the frame configured to receive one or more light sources in the inverted channel, and the kit further comprises: a plurality of lens tabs coupled to the frame and extending into the inverted channel from each of the first and second sides between the upper and lower ends; one or more shelves coupled to the frame and extending inward toward a vertical plane bisecting the inverted channel from a point that is at the lower end or between the lower end and the plurality of lens tabs; where the lens tabs and shelves are configured to support a lens between any of: the one or more shelves independent of the lens tabs; one or more of the lens tabs and the one or more shelves; or the plurality of lens tabs independent of the one or more shelves. In some embodiments, the frame defines an enclosed space within which electronic components can be enclosed independent of a troffer.

In some embodiments of the present kits, the frame: defines a plurality of inverted channels each having a cross-sectional shape that includes an upper end, a lower end that is wider than the upper end, and first and second sides between the upper end and the lower end, the frame configured to receive one or more light sources in each inverted channel; and includes a sensor bay disposed between two of the inverted channels and having a mounting location configured to be coupled to one or more sensors; where the frame is configured to be coupled to a plurality of lenses such that (1) each lens encloses at least a portion of a different one of the inverted channels, and (2) none of the lenses cover the mounting location. In some embodiments, the frame defines an enclosed space between the inverted channels within which electronic components can be enclosed independent of a troffer. In some embodiments, at least a portion of one of the first and second sides of one of the inverted channels defines at least a portion of the sensor bay. In some embodiments, a single piece of sheet metal defines at least a portion of the inverted channels and the sensor bay.

In some embodiments of the present kits, the frame: defines a plurality of inverted channels each having a cross-sectional shape that includes an upper end, a lower end that is wider than the upper end, and first and second sides between the upper end and the lower end, the portions of the frame defining the first and second sides of the cross-sectional shape having reflector surfaces facing the channel, the frame configured to receive one or more light sources in each inverted channel; and includes a component bridge configured to be coupled to control components and/or driving components for the light sources. In some embodiments, the component bridge is spaced apart from the portions of the frame having reflector surfaces such that airflow is permitted between the component bridge and the portions of the frame having reflector surfaces. In some embodiments, the component bridge is configured to substantially enclose a volume defined at least in part by the sides of the inverted channels opposite the reflector surfaces. In some embodiments, the component bridge has a length extending substantially parallel to a length of the inverted channels. In some embodiments, the component bridge has a length extending substantially perpendicular to a length of the inverted channels. In some embodiments, the frame defines an enclosed space between the inverted channels within which electronic components can be enclosed independent of a troffer. In some embodiments, the frame comprises: a first piece of sheet metal defining the cross-sectional shape of the inverted channels; second and third pieces of sheet metal enclosing first and second ends of the inverted channels; and a fourth piece of sheet metal coupled to at least one of the second and third pieces of sheet metal and defining the component bridge. Some embodiments further comprise: a fifth piece of sheet metal extending between the tops of the inverted channels of the first piece of sheet metal, and between the second and third pieces of sheet metal, to substantially enclose the space between the tops of the inverted channels independent of a troffer. In some embodiments, the frame comprises: a single piece of sheet metal that defines at least a portion of the cross-ssectional shape of the inverted channels, encloses at least a portion of the first and second ends of the inverted channels, and defines at least a portion of the component bridge.

Some embodiments of the present kits further comprise: a plurality of light-emitting-diodes (LEDs) coupled to the frame. Some embodiments further comprise: a processor coupled to the plurality of LEDs to control the operation of the LEDs. Some embodiments further comprise: an LED dimming power supply in electrical communication with the plurality of LEDs, the LED dimming power supply configured to receive control signals from the processor. Some embodiments further comprise: one or more sensors coupled to the processor and configured to detect one or more events or environmental characteristics; where the processor is configured to control the operation of the LEDs responsive to one or more events or environmental characteristics detected by the one or more sensors. In some embodiments, the environmental characteristics comprise at least an occupancy of an environment. In some embodiments, the one or more sensors comprise at least one camera configured to capture at least two images of the environment and the processor is configured to compare the at least two images to detect changes in the environment. In some embodiments, the one or more sensors comprise a motion sensor configured to capture data indicative of motion within the environment. Some embodiments further comprise: a wireless transceiver configured to communicate with one or more of: a second light fixture, a group or sub-group of light fixtures, a controller, a switch, an electrical outlet, a relay controlling a window shade, an HVAC damper or other controller, a computer, a tablet computer, and/or a cell phone or other mobile communications device.

Some embodiments of the present apparatuses comprise: a frame for a light fixture, the frame defining an elongated, inverted channel having a cross-sectional shape that includes an upper end, a lower end that is wider than the upper end, and first and second sides between the upper end and the lower end, the frame configured to receive one or more light sources in the inverted channel; a plurality of lens tabs coupled to the frame and extending into the inverted channel from each of the first and second sides between the upper and lower ends; one or more shelves coupled to the frame and extending inward toward a vertical plane bisecting the inverted channel from a point that is at the lower end or between the lower end and the plurality of lens tabs; where the lens tabs and shelves are configured to support a lens between any of: the one or more shelves independent of the lens tabs; one or more of the lens tabs and the one or more shelves; or the plurality of lens tabs independent of the one or more shelves.

Some embodiments of the present apparatuses comprise: a frame for a light fixture, where the frame: defines a plurality of inverted channels each having a cross-sectional shape that includes an upper end, a lower end that is wider than the upper end, and first and second sides between the upper end and the lower end, the frame configured to receive one or more light sources in each inverted channel; and includes a sensor bay disposed between two of the inverted channels and having a mounting location configured to be coupled to one or more sensors; where the frame is configured to be coupled to a plurality of lenses such that (1) each lens encloses at least a portion of a different one of the inverted channels, and (2) none of the lenses cover the mounting location. In some embodiments, at least a portion of one of the first and second sides of one of the inverted channels defines at least a portion of the sensor bay. In some embodiments, a single piece of sheet metal defines at least a portion of the inverted channels and the sensor bay.

Some embodiments of the present apparatuses comprise: a frame for a light fixture, where the frame: defines a plurality of inverted channels each having a cross-sectional shape that includes an upper end, a lower end that is wider than the upper end, and first and second sides between the upper end and the lower end, the portions of the frame defining the first and second sides of the cross-sectional shape having reflector surfaces facing the channel, the frame configured to receive one or more light sources in each inverted channel; and includes a component bridge configured to be coupled to control components and/or driving components for the light sources. In some embodiments, the component bridge is spaced apart from the portions of the frame having reflector surfaces such that airflow is permitted between the component bridge and the portions of the frame having reflector surfaces. In some embodiments, the component bridge is configured to substantially enclose a volume defined at least in part by the sides of the inverted channels opposite the reflector surfaces. In some embodiments, the component bridge has a length extending substantially parallel to a length of the inverted channels. In some embodiments, the component bridge has a length extending substantially perpendicular to a length of the inverted channels. In some embodiments, the frame comprises: a first piece of sheet metal defining the cross-sectional shape of the inverted channels; second and third pieces of sheet metal enclosing first and second ends of the inverted channels; and a fourth piece of sheet metal coupled to at least one of the second and third pieces of sheet metal and defining the component bridge. In some embodiments, the frame comprises: a single piece of sheet metal that defines at least a portion of the cross-sectional shape of the inverted channels, encloses at least a portion of the first and second ends of the inverted channels, and defines at least a portion of the component bridge.

Some embodiments of the present apparatuses further comprise: a plurality of lens tabs coupled to the frame and extending into each inverted channel from each of the first and second sides between the upper and lower ends; one or more shelves coupled to the frame adjacent each inverted channel and extending inward toward a vertical plane bisecting the inverted channel from a point that is at the lower end or between the lower end and the lens tabs extending into the inverted channel; where the lens tabs and shelves are configured to support a lens relative to each inverted channel between any of: the one or more shelves adjacent the inverted channel independent of the lens tabs extending into the inverted channel; one or more of the lens tabs extending into the inverted channel and the one or more shelves adjacent of the inverted channel; or the plurality of lens tabs extending into the inverted channel independent of the one or more shelves adjacent to the inverted channel. In some embodiments, a space external to and between the upper ends of adjacent inverted channels is substantially enclosed. In some embodiments, a lower side of the frame is configured to be coupled to a T-bar frame of a suspended ceiling without a separate troffer. In some embodiments, the frame is configured to be coupled to a troffer. Some embodiments further comprise: trim extending around at least a portion of the perimeter of the frame and coupled to a lower side of the frame, the trim configured to contact an upper surface of a T-bar support of a suspended ceiling frame such that the apparatus can be mounted in a suspended ceiling frame without a troffer. In some embodiments, at least a portion of the trim is unitary with the frame. In some embodiments, at least a portion of the trim is removably coupled to the frame.

Some embodiments of the present apparatuses further comprise: a cable coupled to the frame; a tab having a first end and a second end, the tab coupled to the cable at a point disposed between and spaced apart from the first and second ends. In some embodiments, the tab includes a hole configured to receive a screw for coupling the tab to a troffer. In some embodiments, the frame defines a first hole extending through a portion of the frame, and the apparatus further comprises: a printed circuit board (PCB) including at least one light-emitting diode and defining a second hole through the PCB; and a tree plug having a head portion and a shaft portion, the shaft portion having a flexible portion defining a maximum outer transverse dimension of the shaft portion, the flexible portion biased outwardly and configured to be compressed or deflected inward to reduce the outer transverse dimension of the shaft portion; where the tree plug extends through the second hole of the PCB and the first hole of the frame to couple the PCB to the frame.

Some embodiments of the present kits comprise: one of the present apparatuses and a troffer (e.g., configured to be coupled to a T-bar frame of a suspended ceiling) and to receive at least a portion of the apparatus such that the troffer supports the frame. In some embodiments, the troffer includes first and second ends, first and second sides extending between the first and second ends, a lower end configured to be coupled to a T-bar frame of a suspended ceiling, and an upper end spaced apart from the lower end, at least 25% (e.g., a majority) of the upper end is open. In some embodiments, the troffer includes one or more sheets of metal defining the ends and sides, and portions of the one or more sheets of metal are bent inward to define an upper lip and downward to define an inner lip. In some embodiments, the upper lip includes triangular portions at corners between adjacent ones of the ends and sides. In some embodiments, the troffer includes one or more braces extending from the first side to the second side between the first and second ends. In some embodiments, the troffer includes first and second ends each having a vertical wall portion, a horizontal shelf portion extending inward from the vertical wall portion toward the other of the first and second ends, inner ends of the horizontal shelves separated by a first distance; the frame has a first end, a second end, and a frame length extending between the first and second ends; and the kit further comprises: a first mounting member coupled to the frame and configured to contact the horizontal shelf portion of the first end of the troffer to support the frame relative to the first end of the troffer; and a second mounting member coupled to the frame and configured to contact the horizontal shelf portion of the second end of the troffer to support the frame relative to the second end of the troffer.

Some embodiments of the present methods (e.g., of retrofitting a light fixture into a rectangular troffer with first and second ends each having a vertical wall portion and a lower horizontal shelf portion extending inward from the vertical wall portion toward the other of the first and second ends, inner surfaces of the vertical wall portions separated by a first distance) comprise: coupling a first end of a frame for a light fixture to the first end of the troffer via a mounting member coupled to the frame and configured to extend beyond the first end of the frame to support the frame relative to the first end of the troffer; and coupling a second end of a frame for a light fixture to the second end of the troffer via a mounting member coupled to the frame and configured to extend beyond the second end of the frame to support the frame relative to the second end of the troffer. Some embodiments further comprise: coupling a first mount to an inner surface of the vertical wall portion of the first end of the troffer; coupling a second mount to an inner surface of the vertical wall portion of the second end of the troffer; where each mount has a mounting surface facing the inner surface of the respective vertical wall portion and a protrusion extending to an inner end spaced from the mounting surface by a protrusion depth such that a distance between mounts on opposing ends of the troffer define a mount-opening length that is equal to or less than: the first distance less twice the protrusion depth; and where the first mounting member is coupled to the first end of the troffer via contact with the protrusion of the mount coupled to the first end of the troffer, and the second mounting member is coupled to the second end of the troffer via contact with the protrusion of the mount coupled to the second end of the troffer. In some embodiments, a cable is coupled to a frame and to a tab at a point between first and second ends of the cable, and the method further comprises: coupling the cable to the troffer. In some embodiments, coupling the cable to the troffer includes inserting the tab through an opening in the troffer and rotating the tab to prevent the tab from being retracted through the opening. In some embodiments, the tab includes a hole configured to receive a screw for coupling the tab to a troffer, and coupling the cable to the troffer includes inserting a fastener through the hole in the tab and into a portion of the troffer.

Some embodiments of the present methods comprise: inserting a tree plug through a first hole in a frame of a light fixture and through a second hole in a printed circuit board (PCB) to couple the PCB to the light fixture; where the tree plug has a head portion and a shaft portion, the shaft portion having a flexible portion defining a maximum outer transverse dimension of the shaft portion, the flexible portion biased outwardly and configured to be compressed or deflected inward to reduce the outer transverse dimension of the shaft portion.

In some embodiments of the present apparatuses for mounting a light in a suspended ceiling, the apparatus comprises: a troffer configured to be coupled to a T-bar frame of a suspended ceiling and to receive at least a portion of the apparatus such that the troffer supports the frame, the troffer including first and second ends, first and second sides extending between the first and second ends, a lower end configured to be coupled to a T-bar frame of a suspended ceiling, and an upper end spaced apart from the lower end, at least 25% (e.g., a majority) of the upper end is open. In some embodiments, the troffer includes one or more sheets of metal defining the ends and sides, and portions of the one or more sheets of metal are bent inward to define an upper lip and downward to define an inner lip. In some embodiments, the upper lip includes triangular portions at corners between adjacent ones of the ends and sides. In some embodiments, the troffer includes one or more braces extending from the first side to the second side between the first and second ends.

Some embodiments of the present methods comprise: coupling an embodiment of the present open-top troffers to a T-bar frame of a suspended ceiling; and coupling a frame to the troffer, the frame defining a space within which electronic or electrical components can be substantially enclosed independent of the troffer.

Some embodiments of the present switches (e.g., for controlling a light fixture) comprise: a junction box; a transformer disposed in the junction box and configured to receive line voltage and transform the line voltage to low voltage, the transformer having at least two low voltage terminals; and a low voltage user input device configured to be in direct electrical communication with at least two of the low voltage terminals and to receive user input indicative of a desired lighting condition; where the switch is configured to control at least one light fixture at least based on the user input. Some embodiments further comprise: a faceplate configured to secure the low voltage user input device relative to the junction box. Some embodiments further comprise: at least one indicator configured to provide information indicative of the operational state of at least one of the switch and the at least one light fixture. In some embodiments, the at least one indicator comprises an LED. Some embodiments further comprise: a wired communications link configured to communicate with the at least one light fixture. Some embodiments further comprise: a wireless transceiver configured to communicate with the at least one light fixture. In some embodiments, the user input device comprises at least one of a button, knob, switch, slider, or touchscreen. In some embodiments, the switch is configured to dim the at least one light fixture. In some embodiments, the switch further comprises processor configured to control the at least one light fixture. Some embodiments further comprise: one or more sensors configured to detect one or more events or environmental characteristics. In some embodiments, at least one of the one or more sensors comprises an optical sensor. In some embodiments, the environmental characteristics comprise at least an occupancy of an environment. In some embodiments, the processor is further configured to control the operation of the light fixture responsive to one or more events or environmental characteristics detected by the one or more sensors. In some embodiments, the switch does not comprise any low voltage wires between the transformer and the user input device.

Some embodiments of the present kits further comprise one of the present switches. Some embodiments of the present apparatuses further comprise one of the present switches.

Some embodiments of the present systems comprise: a low voltage switch having a low voltage user input device configured to receive user input indicative of a desired lighting condition; at least one slave light fixture; and a master light fixture configured to receive line voltage and be in electrical communication with the low voltage switch, the master light fixture having a communications device configured to communicate with the at least one slave light fixture; where the master light fixture is configured to receive the user input and vary a lighting condition based on at least the user input by controlling the at least one slave light fixture. In some embodiments, the master light fixture is further configured to supply low voltage power to the low voltage switch. Some embodiments further comprise: CAT5E plenum cable configured to transmit at least one of power or electrical signals between the master light fixture and the low voltage switch. In some embodiments, the master light fixture is closer in a physical proximity to the low voltage switch than any slave light fixture. In some embodiments, the communications device comprises a wireless communications device. In some embodiments, the communications device comprises a wired communications device. In some embodiments, the switch does not comprise any line voltage components.

Some embodiments of the presents methods comprise: replacing any line voltage components within a junction box with a low voltage switch having a user input device configured to receive user input indicative of a desired lighting condition; providing at least one slave light fixture; placing a master light fixture into electrical communication with the low voltage switch, the master light fixture having a communications device configured to communicate with the at least one slave light fixture; and controlling the at least one slave light fixture with the master light fixture based on at least the user input.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The embodiments of the present fixtures, assemblies, and their components shown in the figures are drawn to scale for at least the embodiments shown.

FIG. 1 depicts a perspective view of a prior art troffer.

FIGS. 2A and 2B depicts a partially cutaway and partially cross-sectional side views, respectively, of a first embodiment of the present retrofit kits.

FIGS. 3A and 3B depict a front view and an end view, respectively, of one of the present mounts.

FIG. 3C depicts an end view of a second embodiment of the present mounts.

FIGS. 6A-6C depict a cross-sectional side view of a second embodiment of the present kits during insertion of a frame into a troffer.

FIGS. 8A and 8B depict a perspective view and a cross-sectional end views, respectively, of one of the present frames.

FIGS. 10A and 10B depict a partially cutaway perspective view and a cross-sectional end view of a third embodiment of the present kits.

DETAILED DESCRIPTION OF ILLUSTRATIVE EMBODIMENTS

FIG. 1 depicts a perspective view of a prior-art troffer 10. Troffer 10 is depicted by way of example, and not by way of limitation, and a person of ordinary skill in the art will understand that various troffers (e.g., comprising various shapes, sizes, and/or configurations) are suitable for receiving retrofit kits in accordance with the teachings of the present disclosure. In the example shown, troffer 10 has first and second ends, 14 and 18, respectively, each having a vertical wall portion 22. As shown, vertical wall portions 22 are separated from each other by a first distance 26.

Figure 2B:
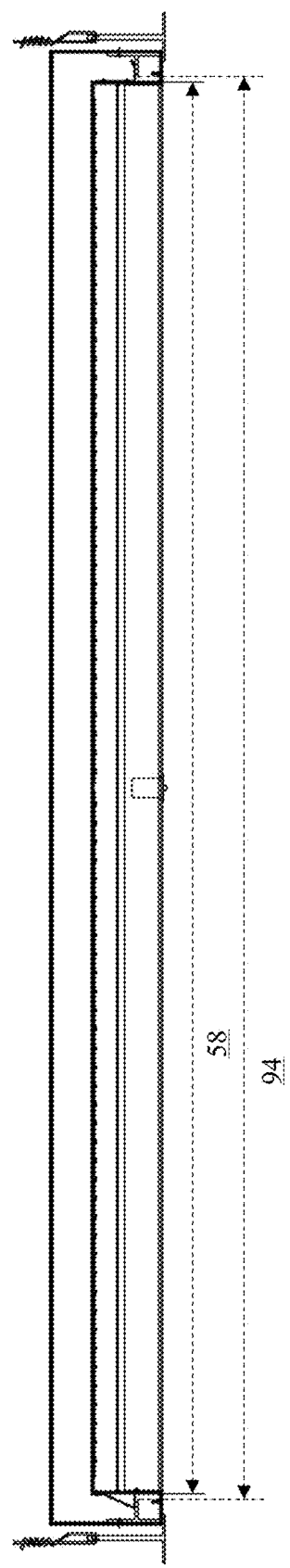

FIG. 2A depicts a partially cut away and partially cross-sectional side view of troffer 10 with one embodiment 42 of the present retrofit kits disposed therein. FIG. 2A shows frame 46 and troffer 10 truncated, as indicated by the break lines, in order to clearly indicate the certain features. FIG. 2B depicts a similar view of a same or a similar kit, shown drawn to scale (e.g., for at least some embodiments). In the depicted embodiment, each vertical wall portion 22 of the troffer also has a lower horizontal shelf portion 30 extending inward from the vertical wall portion toward the other of the first and second ends. As shown, horizontal shelf portion 30 can be configured to rest against and/or be coupled to a T-bar frame 34 of a suspended ceiling grid (e.g., hung via suspension members 38, as shown). In the embodiment shown, kit 42 comprises a frame 46 configured to receive a light fixture (or fixtures) (e.g., a plurality of light-emitting-diodes (LEDs)). In the embodiment shown, frame 46 has a first end 50, a second end 54, and a frame length 58 extending between the first and second ends (e.g., as shown). In the embodiment shown, kit 42 further comprises a first mounting member 62a coupled to the frame (e.g., through fasteners such as screws, bolts, rivets, welds, and/or the like, interlocking features of the frame and/or mounting member, welding, adhesives, and/or the like) and configured to extend beyond first end 50 of frame 46. In the embodiment shown, first mounting member 62a is configured to support frame 46 relative to the first end 14 of troffer 10) (e.g., such that first end 14 of troffer 10 supports frame 46, for example, in the orientation shown). Kit 42 can further comprise a second mounting member 62b coupled to frame 46 and configured to extend beyond second end 54 of frame 46 (e.g., as shown). In the embodiment shown, second mounting member 62b is configured to support frame 46 relative to second end 18 of troffer 10 (in similar manner as first mounting member 62a). In some embodiments (e.g., kit 42) supporting of first and second ends 50 and 54 of frame 46 relative to first and second ends 14 and 18 of troffer 10 can be accomplished alternatively and/or additionally through use of mounts 66a (e.g., two or more mounts 66a, as shown, or more mounts, for example, 2, 3, 4, or more mounts 66a) (described in more detail below). The inclusion and/or number of mounts, and/or the number and/or configuration of mounting members can be selected depending on, for example, the existing troffer (e.g., if installing the present kits as a retrofit). For example, some 1 foot (ft) by 4 feet (ft) (e.g., 1×4) fixtures may include a mount 66 on each end (e.g., 14 and 18), where one end of the frame is supported at first end 14 of the troffer by two mounting members 62a and the other end of the frame is supported by one mounting member 62b (e.g., due to physical constraints) at second end 18 of the troffer.

Figure 3D:
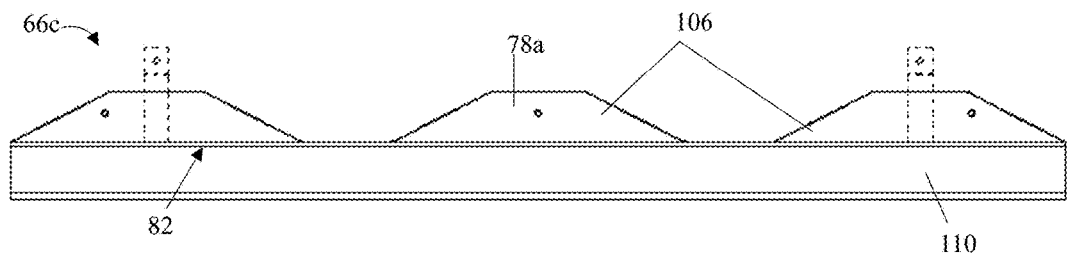
FIG. 3D depicts a side view of a third embodiment of the present mounts.

FIGS. 3A-3D depict views of various mount(s) suitable for use in at least some of the present kits. FIG. 3A is a side view of mount 66a, and FIG. 3B depicts an end view of mount 66a coupled to troffer 10 of which one end is cut away to mount 66a. In the embodiment shown, mount 66a comprises a mounting surface 78 (e.g., for coupling the mount to a troffer, for example, troffer 10 as shown in FIG. 3B). In the embodiment shown, mounting surface 78 is defined on a first side of mount 66a as a planar portion having a lower end 79 and an upper end 80. Mount 66a further comprises a protrusion 82 extending outwardly from an opposite side (e.g., from mounting surface 78) to an inner end 86 spaced from mounting surface 78 by a protrusion depth 92 (e.g., to define a shelf spaced apart from lower end 79 and/or upper end 80). Some troffers (e.g., 10) comprise an interior, second vertical wall portion 32 that extends upwardly from an inner end of horizontal shelf portion 30 (e.g., as shown, forming a generally u-shaped channel). In retrofits configured to be disposed within such troffers, the shelf (e.g., protrusion 86) of each mount (e.g., 66a) is spaced above the lower end 79 of the mount by a distance at least as great as the height of the inner vertical wall portions 32 of the ends of the troffer (e.g., such that protrusion 82 rests on or above vertical wall portion 32 when the mount is coupled to the troffer). In the embodiment shown, protrusion 86 is space from lower end 79 by a distance within the range of about 0.25 inches to about 2.5 inches (e.g., between 0.7 and 1.5 inches).

In some embodiments of the present mounts (e.g., 66a), protrusion depth 92 is substantially the same or greater than a distance 98 from which lower horizontal shelf portion 30 of each end of troffer 10 extends inward from the respective vertical wall portion 22 (e.g., protrusion depth 92 is greater than distance 98). The present mounts may be coupled to and/or be configured to be coupled to a troffer through any structure that permits the functionality described in this disclosure, for example, in the embodiment shown, mount 66a defines one or more holes 114 (e.g., that extend through mounting surface 78). In the embodiment shown at least one of the one or more holes 114 extends through the mount between shelf (e.g., protrusion 82) and upper end 80; however, in other embodiments, holes 114 can be in any suitable location that permits the functionality of this disclosure (e.g., such that mount 66a can be coupled to a troffer). Holes 114 can be configured to facilitate coupling of mount 66a to a troffer (e.g., 10), for example, by permitting passage of fasteners, such as screws or rivets 118 through mount 66a and into and/or through troffer 10. Screws or rivets 118 are shown by way of example, and holes 114 can facilitate different and/or additional coupling means, such as nuts and bolts, spot welds, and/or the like. FIG. 3C depicts a second embodiment 66b of the present mounts in partially cut away and partially cross-sectional fashion. Mount 66b is substantially similar to mount 66a, with the primary exception that mount 66b further comprises a second protrusion 102. Protrusion 102 can be configured such that when mount 66b is coupled to troffer 10, as shown, protrusion 102 does not extend past horizontal shelf portion 30. Through such structure, protrusion 102 can be configured to provide additional support for mount 66b on troffer 10. FIG. 3D depicts a third embodiment 66c of the present mounts. Mount 66c is substantially similar to 66a (and can comprise the features depicted in either FIG. 3B or 3C), with the primary exception that mounting surface 78a of mount 66c comprises generally truncated triangular portions 106 (e.g., trapezoidal portions) which extend from a rectangular portion 110, where the intersection between the rectangular portion 110 and the generally truncated triangular portions 106 is substantially defined by the location of protrusion 82 (e.g., as shown).

The present mounts (e.g., 66a, 66b, 66c, and/or the like) can function as and/or comprise a universal mounting platform that can be configured (e.g., through the structure described above) to install the present retrofit kits (e.g., 42) at a pre-set height (e.g., through configuration and/or location of protrusion 82). For example, through such structure, the present kits can be installed such that the lens plane (e.g., defined by the open portion of frame 46 facing away from troffer 10) can align in the same or substantially the same plane as the ceiling and/or the existing troffer (e.g., such that the retrofit kits can fit substantially "flush" with the ceiling, if desired). Additionally, the present mounts can be configured to be coupled to a wide variety of troffers. For example, while troffers can vary in configuration, most troffers comprise vertical wall portions (e.g., 22). Through mounts configured to be coupled to such vertical wall portions, the present mounts can be configured to be coupled to many of the troffers currently available and/or in use (e.g., and thus the present kits can be installed in a wide variety of troffers).

As best shown in FIG. 2A, the present mounts (e.g., mount 66a) can be configured to be coupled to an inner surface of a vertical wall portion 22 of one of the first and second ends 14 or 18 such that a distance between the mounts on opposing ends of troffer 10 defines a mount opening length 94 that is equal to or less than first distance 26 less (e.g., minus) twice protrusion depth 92 (e.g., as shown). Also depicted in FIGS. 2A and 2B, in the embodiment shown, mounting member 62a is configured to contact protrusion 82 of mount 66a (coupled to first end 14 of troffer 10) to support first end 50 of frame 46 (e.g., by preventing first end 50 from inadvertently falling out and/or otherwise becoming dislodged from troffer 10). However, other embodiments need not comprise a mount and the mounting members may be configured to be coupled to the troffer (e.g., configured to rest on top of horizontal shelf portion 30 and/or over, for example, in a hook-like fashion, vertical wall portion 32, if present). In this embodiment, second mounting member 62b is configured to contact protrusion 82 of mount 66a (coupled to second end 18 of troffer 10) to support second end 54 of frame 46 (e.g., in a similar or in the same fashion).

Figure 4A:
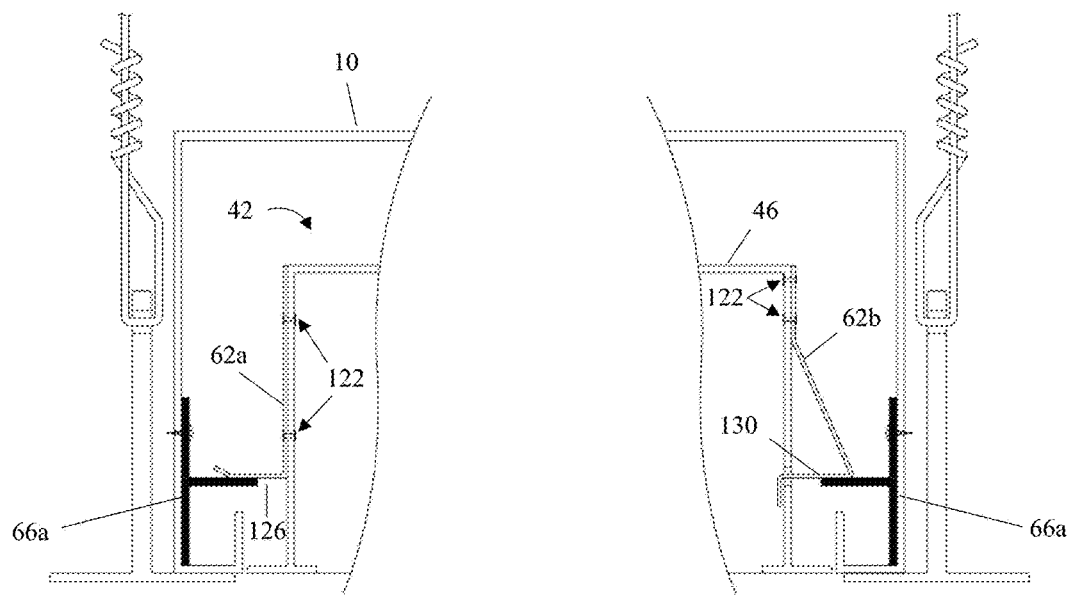
FIG. 4A depicts an enlarged cutaway side view of the kit of FIG. 2.
Figure 4B:
FIGS. 4B and 4C depict cross-sectional views of alternate embodiments of mounting members.
Figure 4C:
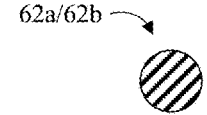

FIGS. 4A-4C depict various mounting members suitable for use in the present kits (e.g., kit 42). FIG. 4A depicts a view that is similar to that of FIG. 2A, with the middle portions of frame 46 and troffer 10 cut away. In the embodiment shown, first mounting member 62a is coupled in fixed relation to frame 46 (e.g., coupled with fasteners 122 at two locations, as shown, to substantially prevent movement of mounting member 62a relative to frame 46 when the mounting member is coupled to the frame), and extends outwardly from the frame (e.g., portion 126 extends away from the frame). Fasteners 122 can comprise any suitable fasteners which permit the functionality described in this disclosure, including, but not limited to, screws, bolts, rivets, pins, clips, and/or the like. As shown in FIGS. 4B and 4C, mounting members 62a and/or 62b can comprise any suitable cross-sectional shape which permits the functionality described in this disclosure, including, but not limited to, flat (e.g., or substantially flat) as shown in FIG. 4B, round (e.g., or rounded) as shown in FIG. 4C, triangular, rectangular, or otherwise polygonal, and/or the like.

Additionally, in some embodiments, the coupling of mounting member 62a (e.g., and/or mounting member 62b, and/or the like) to frame 46 can be adjustable (e.g., configured to secure the frame relative to a wide variety of troffers, in a universal fashion). For example, frame 46 and/or the mounting members may be slotted at locations configured to receive fasteners 122 such that the mounting members are permitted to move (e.g., slide) relative to frame 46 (e.g., in at least a downward direction) before the fasteners are tightened and the mounting members are secured. Through such features, the position of the mounting members relative to the frame can be finely adjusted prior to inserting the frame into the troffer, thus facilitating a desired orientation of frame 46 (e.g., kit 42) relative to the troffer and/or the ceiling (e.g., such that the fixture, kit, and/or frame can be substantially "flush" and/or parallel with the ceiling, if desired). In similar embodiments configured to use a mount (e.g., 66a, 66b, 66c and/or the like) the location of the mounting members relative to the frame can be pre-set (e.g., to correspond to a desired location of frame 46 within troffer 10) (e.g., based at least in part on the location of protrusion 82 of the mount, for example, the height at which protrusion 82 is spaced from lower end 79 in mount 66a shown in FIG. 3A). Such distances can be known (e.g., measured) and thus pre-set in some embodiments of the present kits (e.g., such that a user and/or installer may not have to set and/or adjust the location of the mounting members on the frame).

Figure 5C:
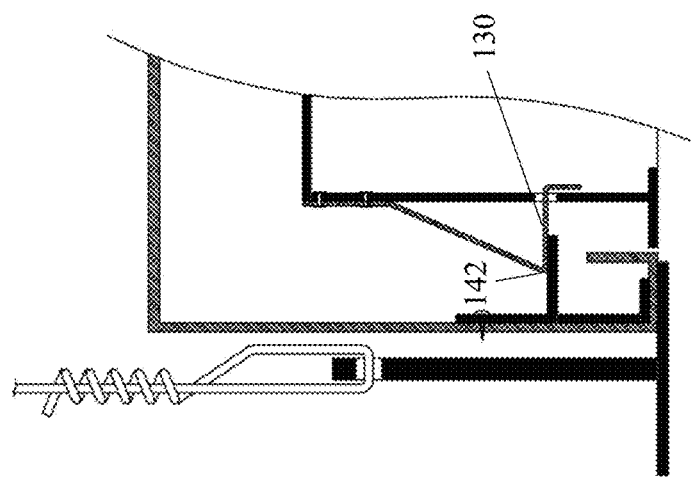
FIGS. 5A-5C depict a partially cutaway side views of a mounting member of FIG. 4A during insertion of a frame into a troffer.
Figure 5B:
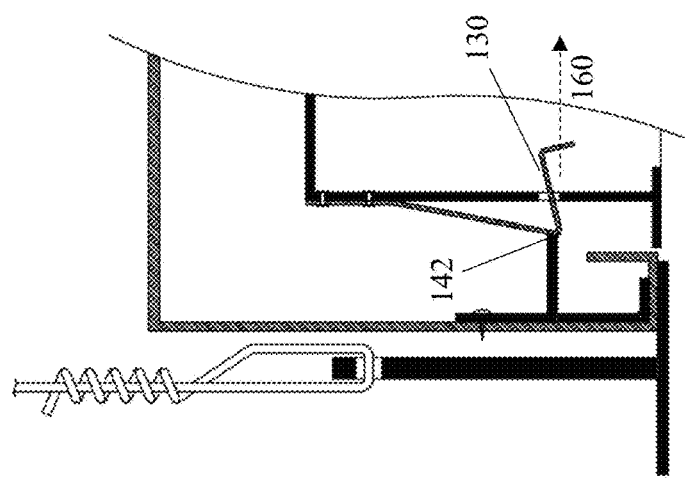
Figure 5A:
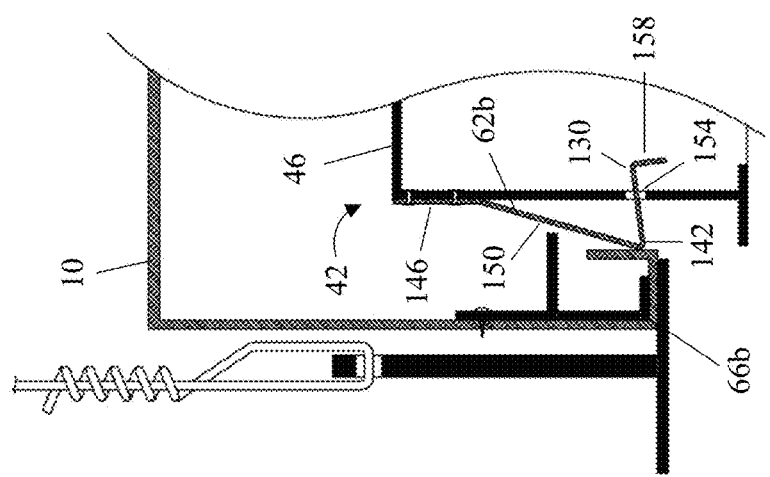

FIGS. 5A-5B depict the operation of mounting member 62b (e.g., during insertion of frame 46 into troffer 10). In the embodiment shown, mounting member 62b has at least a portion 130 configured to move between an extended first position (e.g., FIG. 5C) and a retracted second position (e.g., FIG. 5B, however, mounting member 62b can be configured to retract further, e.g., to a point where mounting member 62b lies substantially against frame 46). In the retracted second position of mounting member 62b (e.g., shown in FIG. 5B), a distance between first end 50 of frame 46 (shown in FIGS. 2A and 2B), and distal end 142 of mounting member 62b is less than mount opening length 94 (e.g., to permit insertion of frame 46 with mounting member 62b into troffer 10). In the embodiment shown, mounting member 62b comprises a spring (e.g., or is spring-like) with an upper end 146 fixed (e.g., coupled) to frame 46 (e.g., at second end 54, as shown in FIG. 2A). Such fixing or coupling can be accomplished in the same or a similar manner as described above for mounting member 62a. In the embodiment shown, mounting member 62b further comprises a lower end 150 which is movable relative to the frame (e.g., second end 54). Through configuration of mounting member 62b (e.g., spring properties), mounting member 62b can be biased towards the extended first position (shown in FIG. 5C) (e.g., such that mounting member 62b resists retraction). In the embodiment shown, the lower end (e.g., 150 and/or portion 130) extends through an end wall of frame 46 (e.g., through hole or slot 154) into an interior of the frame such that a user can pull the lower end (e.g., 150 and/or portion 130) toward the first end of the frame (e.g., first end 50) to move mounting member 62b to the retracted second position (e.g., shown in FIG. 5A) (e.g., such pulling can be facilitated by tab 158). A user may slide the frame into troffer 10 (e.g., FIG. 5A) by extending first end 50 of the frame into the troffer such that mounting member 62a extends over protrusion 82 of mount 66a and, as shown, displacing mounting member 62b into the retracted position shown in FIG. 5B. When mounting member 66b (e.g., lower end 150) is in the appropriate position (e.g., past protrusion 82 of mount 66), mounting member 62b can displace to an extended first position, as shown in FIG. 5C (e.g., "snap" into place). A user can remove frame 46 from troffer 10 by applying force to tab 158 (e.g., generally in direction 160), thus displacing mounting member to a retracted position such that frame 46 can be removed from the troffer (e.g., position shown in 5B).

FIGS. 6A-6C depict a second embodiment 42a of the present retrofit kits. Kit 42a is substantially similar to kit 42, with the primary exception that at least one end of frame 46 (e.g., second end 54) is supported relative to troffer 10 (e.g., relative to first end 14) with mounting member 62c, which may not require an associated mount (e.g., 66a or 66b). In the embodiment shown mounting member 62c comprises a shaft portion 170 (e.g., resembling a pin) slidably and rotatably coupled to frame 46, for example, shaft 170 can have a substantially circular cross-section and be disposed within a hole 154 with a slightly larger diameter than shaft 170 such that shaft 170 can slide and rotate relative to hole 154 and thus frame 46. Such slidable and rotatable coupling can allow shaft 174 to be moveable between an extended first position (e.g., FIG. 6B) in which mounting member 62 extends outwards from the frame (e.g., from second end 54) and a retracted second position (e.g., FIG. 6A). In the embodiment shown, mounting member 62c further comprises a leg portion 174 (best shown in FIG. 6C) which can be configured to support frame 46 within troffer 10. For example, in kits comprising mounting member 62a or 62b (e.g., 42a), when the frame is disposed within the troffer with mounting member 62a or 62b contacting lower horizontal shelf portion 30 of first end 14 of the troffer (e.g., as shown in FIG. 2, 4A, or 5C) and shaft portion 170 is in the extended first position (e.g., FIG. 6B), shaft portion 174 can be rotated (e.g., via handle 178) to cause leg portion 174 to contact lower horizontal shelf portion 30 of second end 18 of the troffer to support (e.g., and/or secure) second end 54 of frame 46. Leg member 174 can define a cam surface 190, which can at least allow adjustment of the relative location of frame 46 (e.g., second end 54) within troffer 10 (e.g., by rotating shaft 170 to change the effective vertical dimension of leg member 174, thus moving frame 46 relative to troffer 10). In the embodiment shown, leg member 174 extends radially from the axis of rotation of shaft 170 by a distance of at least about 0.25 inches (in) (e.g., a distance within the range of about 0.25 to about 1.0 in). In the embodiment shown, shaft portion 170 is biased toward the extended first position (e.g., by spring 178, as shown). In the retracted second position of mounting member 62c (e.g., shown in FIG. 6A), a distance between first end 50 of frame 46 (shown in FIGS. 2A and 2B), and distal end 186 of mounting member 62c is less than mount opening length 94 (e.g., to permit insertion of frame 46 with mounting member 62c into troffer 10). Kit 42 and 42a are shown by way of example, and not by way of limitation. The present kits can comprise any suitable number of mounting members, and any number of the mounting members may comprise mounting member 62a, 62b, 62c, or other mounting members that may be similar in structure and/or function to those described herein. For example, in some embodiments comprising mounting member 62c (e.g., or a similar mounting member), a mount (e.g., 66a, 66b, 66c, and/or the like) can be provided and shaft portion 174 (e.g., resembling a pin) can be configured to rest on a protrusion (e.g., 82) of the mount when the mounting member is in the extended first position (e.g., to secure the frame relative to the troffer on at least one end). In similar embodiments, a mount may not be required, and shaft portion 174 can be configured to rest on horizontal shelf portion 30 or vertical wall portion 32 when in the extended first position. In these embodiments, shaft portion 170 may need not be rotatable (e.g., may only be slidable) relative to hole 154, and the mounting members may need not comprise a leg member 174.

Figure 7B:
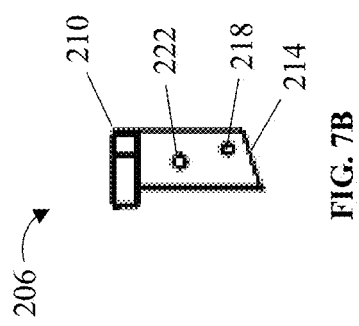
FIGS. 7A and 7B depict one of the present frames suspended from a troffer by a safety and/or service cable and one of the present mounting tabs, respectively.
Figure 7A:
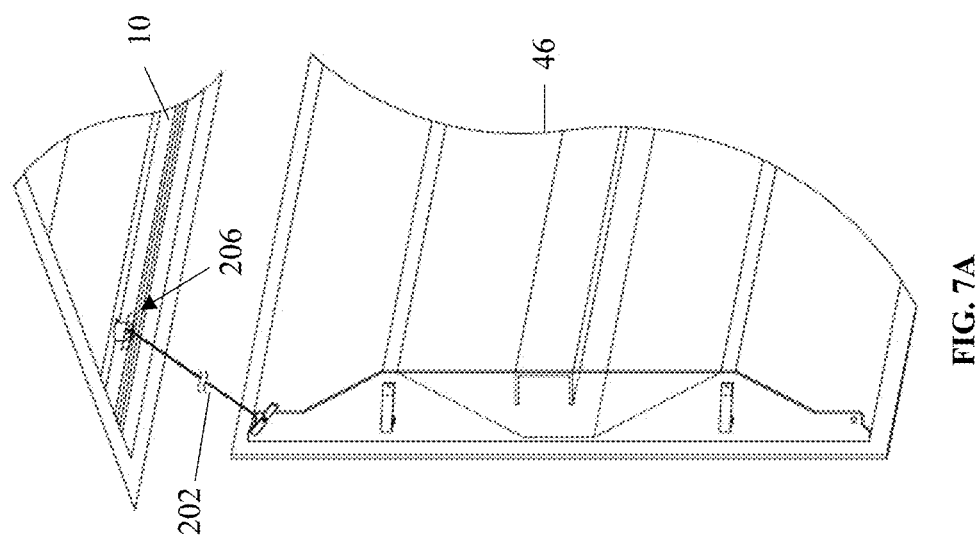

The present mounts and/or mounting members can be configured (e.g., as described above) to provide for easy removal and/or installation of the present kits (e.g., fixtures), and thus easy maintenance, upgrade, repair and/or other service, and/or otherwise easy access to the fixtures and/or troffers. The foregoing description of mounting members (e.g., 62a, 62b, 62c, and/or the like) is provided by way of example and not by limitation. Additionally, kits and/or fixtures (e.g., whether new or retrofit) can comprise any suitable number of mounting members in any suitable configuration (e.g., some or all comprising mounting member 62b (e.g., "spring clips"), some or all comprising mounting member 62a (e.g., "fixed clips"), some or all comprising member 62c, or any other configuration, for example, with other mounting members that may be similar to mounting members described above). FIGS. 7A and 7B depict a feature present in some embodiments of the present kits (e.g., kits 42 and/or 42a). In the embodiment shown, kit 42 further comprises one or more safety and/or service cables (e.g., safety and/or service cable 202) configured to be coupled to troffer 10 and frame 46. Such coupling can be accomplished through various means. For example, tab 206 having a first end 214 and a second end 218 can be coupled to cable 202 at a point disposed between and spaced apart from the first and second ends (e.g., cable 202 can be threaded through a hole 218 of tab 206), and tab 206 can be secured to troffer 10 (e.g., through a fastener disposed through hole 222 of tab 206 and into troffer 10). Cable 202 may be attached to frame 46 in a similar or the same fashion (e.g., with an additional tab disposed on cable 202 and attached to frame 46). Cable 202 may comprise T-shaped ends such that cable 202 captures any tab(s) disposed on the cable (e.g., such that tabs cannot inadvertently be removed from the cable). For example, such T-shaped ends can comprise a bar, pin, or otherwise rod-shaped member attached to the end of the cable in a substantially perpendicular (e.g., to the cable) manner. Such T-shaped ends may also be foldable such that the ends can be folded to lie flatly and/or in a parallel fashion with respect to the cable (e.g., 202). T-shaped members may be folded to allow for insertion of such a member through a hole in the troffer, frame, and/or a tab (e.g., 206). Once the folded T-shaped member has been inserted through the hole, the T-shaped member can be released and/or otherwise unfolded (e.g., back to a substantially perpendicular state) to secure the cable relative to the troffer, frame, and/or tab (e.g., 206) (e.g., in a fashion that may be similar in operation to a drywall anchor). In some embodiments, tab 206 may not be required on at least one end of the cable, and T-shaped member (e.g., on at least one end of cable not comprising tab 206) may comprise a hole configured to receive a fastener (e.g., a self-tapping sheet metal screw, and/or any other suitable fastening member) and to fasten the cable (e.g., the T-shaped member) to a troffer (e.g., 10) and/or frame (e.g., 46) (e.g., cable 202 can be directly secured, through T-shaped member(s)) to the troffer and/or frame). One or more cables 202 can be coupled to a troffer during installation (e.g., cable 202 can function as an "installation cable") to permit wiring to be connected and, if frame 46 becomes inadvertently dislodged from frame troffer 10 (e.g., dropped during installation, or falling during an emergency, such as an earthquake), cable(s) 202 can prevent the frame from falling and hitting objects and/or people that may be underneath.

FIG. 8A is a perspective view of frame 46, which is suitable for use in the present kits (e.g., kit 42). Frame 46 is generally configured to fit within (e.g., be coupled to) an existing troffer (e.g., such that the present kits can be used for retrofit purposes inside a standard sized troffer). For example, frame 46 has nominal dimensions of a length 220 of 4 feet (ft) and a width 224 of 2 ft. In other embodiments, the frame can have any dimensions which permit the functionality described in this disclosure, for example, nominal dimensions of 2 ft by 2 ft, or 1 ft by 4 ft, or other dimensions that may be smaller or larger in length and/or width (e.g., any size which may, for example, be configured to fit within an existing troffer). FIG. 8B depicts a cross-sectional end view of frame 46. In the embodiment shown, frame 46 defines an inverted channel 230 (e.g., two (2) inverted channels 230 which are elongated). Other embodiments can comprise any number of inverted channels, for example, 1, 2, 3, 4, 5, 6, or more inverted channels 230. Inverted channel(s) 230 comprise a cross-sectional shape (e.g., as shown) that includes an upper end 234 and a lower end 238 that is wider than the upper end, with sides 242 (e.g., first and second sides) between the upper and lower ends. In the embodiment shown, frame 46 is configured to receive (e.g., be coupled to and/or comprise) one or more (e.g., a plurality of) light sources (e.g., a plurality of light-emitting diodes (LEDs)) within inverted channel(s) 230, for example, at location 236, which may be internal to channel(s) 230 and adjacent upper end 234).

First and second sides 242 of inverted channel 230 can further comprise reflector surfaces that face into the channel (e.g., to control and/or direct light within inverted channel 130). In the embodiment shown, frame 46 further comprises a sensor bay 246 disposed between and/or defined by the inverted channels 230 (e.g., a centralized sensor bay). In the embodiment shown, sensor bay 246 has a mounting location 250 (e.g., or multiple mounting locations, with some embodiments having centralized sensor mounting locations, as shown) configured to be coupled to one or more sensors 254 (described in more detail below) (e.g., by using fasteners, such as nuts, bolts, screws, rivets, snaps, clips and/or the like, tape such as double-sided tape, adhesives, such as glue, interlocking features between sensor(s) 254 and/or mounting location(s) 250, a friction fit between sensor(s) 254 and/or mounting location(s) 250, and/or the like. In the embodiment shown, at least a portion of one of the first and second sides 242 of one of the inverted channels 230 defines at least a portion of the sensor bay 246 (e.g., as shown). For example, in the embodiment shown, a single piece of sheet metal defines at least a portion of inverted channel(s) 230 and the sensor bay (e.g., sensor bay 246 shares a wall with at least one inverted channel 230). The present frames can be constructed in any suitable fashion using any suitable material (e.g., sheet metal) in any suitable quantity. For example, in the embodiment shown, frame 46 is constructed from a first piece 258 of sheet metal that defines the cross-sectional shape of inverted channel 230, second and third pieces (262 and 266 respectively) of sheet metal enclosing first and second ends of the inverted channels (e.g., as shown).

In the embodiment shown, frame 46 further comprises a component bridge 270 (e.g., which may comprise and/or be defined by a fourth piece 274 of sheet metal that is coupled to at least one of the second and third pieces of sheet metal). For further example, in other embodiments, frame 46 can comprise a single piece of sheet metal that defines at least a portion of the cross-sectional shape of inverted channel(s) 230, encloses at least a portion of the first and second ends of the inverted channels (e.g., in a same or substantially similar fashion to as described for second and third pieces 262 and 266 above), and defines at least a portion of component bridge 270. Component bridge 270 can be configured to be coupled to control components and/or driving components for the light sources (e.g., components described in more detail below). In the embodiment shown, component bridge 270 has a length extending substantially parallel to a length of the inverted channels (e.g., as shown in FIG. 8B). However, in other embodiments, component bridge 270 can have a length extending substantially perpendicular to a length of the inverted channels 230 (e.g., and be coupled to and/or between inverted channels 230 on sides 242 at any point between upper end 234 and lower end 238, and, in some embodiments, may transect an inverted channel (e.g., to at least partially define two inverted channels having lengths that extend substantially along the same axis) and/or define a boundary between two inverted channels). The present kits and/or fixtures can comprise any suitable number of component bridges (e.g., 1, 2, 3, 4, or more component bridges, in any suitable configuration (e.g., extending parallel with inverted channels 230, extending perpendicular to inverted channels 230, and/or otherwise angularly disposed relative to inverted channels 230).

Figure 9A:
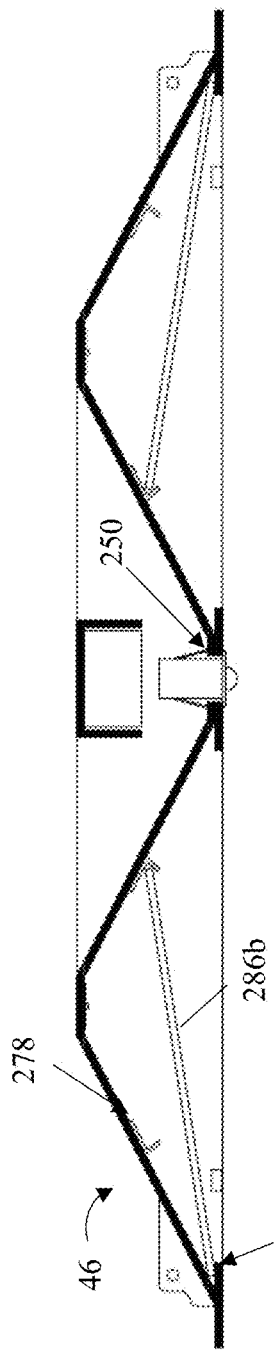
FIGS. 9A-9C depict various lenses and lens configurations in the frame of FIGS. 8A and 8B.
Figure 9B:
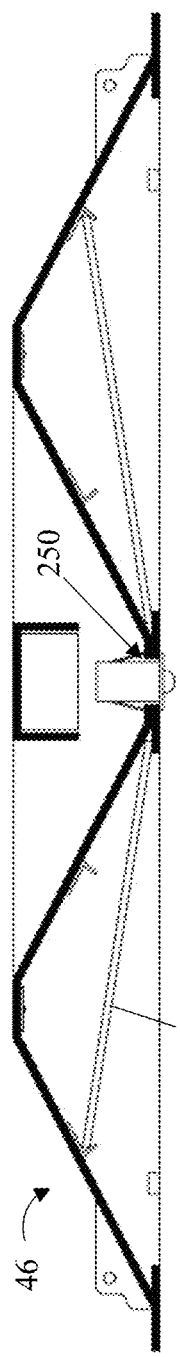
Figure 9C:
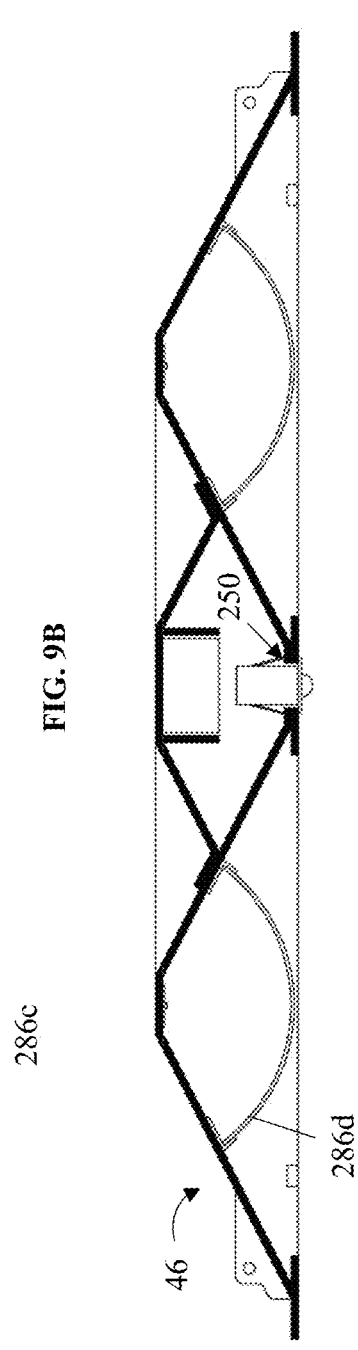

As shown component bridge 270 allows for installation of electrical assemblies without interfering with light output (e.g., electrical assemblies can be installed behind reflector surfaces). In the embodiment shown, component bridge 270 is spaced apart from the portions of the frame having reflector surfaces (e.g., sides 242) such that airflow is permitted between the component bridge and the portions of the frame having reflector surfaces (e.g., to facilitate cooling of and/or prevent over-heating of control components and/or driving components which may be disposed within component bridge 270). However, in other embodiments, space external to and between the upper ends 234 of adjacent inverted channels 130 may be substantially closed (e.g., component bridge 270 can be configured to substantially enclose a volume defined at least in part by sides 242 of inverted channels 230 opposite the reflector surfaces) (e.g., as shown in FIG. 9C). In some embodiments (e.g., in new fixtures, for example, rather than retrofit fixtures) component bridge 270 can substantially enclose sensor bay 246 (e.g., by spanning the distance between upper ends 234 of respective inner channels 230), which can provide the function of an enclosed containment troffer that can contain many, if not all, of the electrical components of the fixtures and/or kits (e.g., and can be installed as a new fixture).

In the embodiment shown, frame 46 further comprises a plurality of lens tabs 278 (e.g., coupled to frame 46) that extend into inverted channel(s) 230 from first and second sides 242, and one or more shelves 282 (e.g., coupled to frame 46) that extend inward towards a vertical plane bisecting an inverted channel 230 from a point that is at lower end 238 or between the lower end and the plurality of lens tabs 278 (e.g., as shown). Lens tabs 278 and/or shelves 282 are configured to support a lens (e.g., a diffusing lens) in a variety of positions, for example, and not by way of limitation, between any of: the one or more shelves independent of the lens tabs (e.g., to support flat lens 286a, as shown in FIG. 8B); one or more of the lens tabs and the one or more shelves (e.g., to support sloped lenses 286b and 286c, as shown in FIGS. 9A and 9B, respectively); or the plurality of lens tabs independent of the one or more shelves (e.g., to support curved (e.g., convex) lens 286d, as shown in FIG. 9C). Lens shapes are shown by way of example, and not limitation, and the present retrofit kits and/or frames can be configured to support a variety of lenses (e.g., "V-shaped" lenses). As shown in the above examples, frame 46 can be configured to be coupled to a plurality of lenses (e.g., 286a, 286b, 286c, and/or 286d) such that each lens encloses at least a portion of a different one of the inverted channel (e.g., as shown) and none of the lenses cover mounting location 250 (e.g., such that any sensor(s) 254 are not blocked by the lenses when the lenses are installed into frame 46).

Referring now to FIGS. 10A and 10B, shown is an embodiment 46a of the present frames (e.g., kit 42b). Frame 46a is substantially similar to frame 46, with the primary exception that frame 46a has a lower side 298 is configured to be coupled to a T-bar frame 34 without a separate troffer (e.g., 10) (e.g., and/or without the need for mounting members, such as 62a, 62b, and/or 62c, or mounts e.g., 66a, 66b, and/or 62c). In the embodiment shown, such configuration is achieved through trim 302 which extends around at least a portion of the perimeter of frame 46a (e.g., as shown in FIG. 10A) and is coupled to lower side 298. In the embodiment shown, frame 46a can be coupled to and/or secured within T-bar frame 34 such that trim 302 contacts an upper surface of T-bar frame (e.g. support) 34 of a suspended ceiling frame, as shown. Through such features, frame 46a (e.g., and/or corresponding kit 42b) can be mounted in a suspended ceiling without a troffer (e.g., for a new installation as opposed to a retrofit installation). In the embodiment shown, at least a portion 306 of trim 302 is removably coupled to frame 46a (e.g., via clips or any other suitable structure, such as, for example, to facilitate installation and/or removal of a lens across the lower end of each channel 230 as illustrated in FIG. 8B). In this way, trim portion 306 can be removed as shown to allow access to sensor mounting location 250 and/or prevent blocking of any sensor(s) 254. Trim portion can comprise any suitable material, such as plastic, sheet metal (e.g., steel), aluminum, and/or the like and can comprise a variety of finishes including, but not limited to, raw (e.g., unfinished), brushed, polished, painted (e.g., in white), and/or the like, which may be selected, for example, for aesthetic purposes. Additionally, trim portion, through its configuration, can indicate the features present in a given fixture. For example, if portion 306 has no openings, the fixture may not comprise a battery (e.g., emergency back-up battery), sensors, test buttons, and/or the like.

Figure 11:
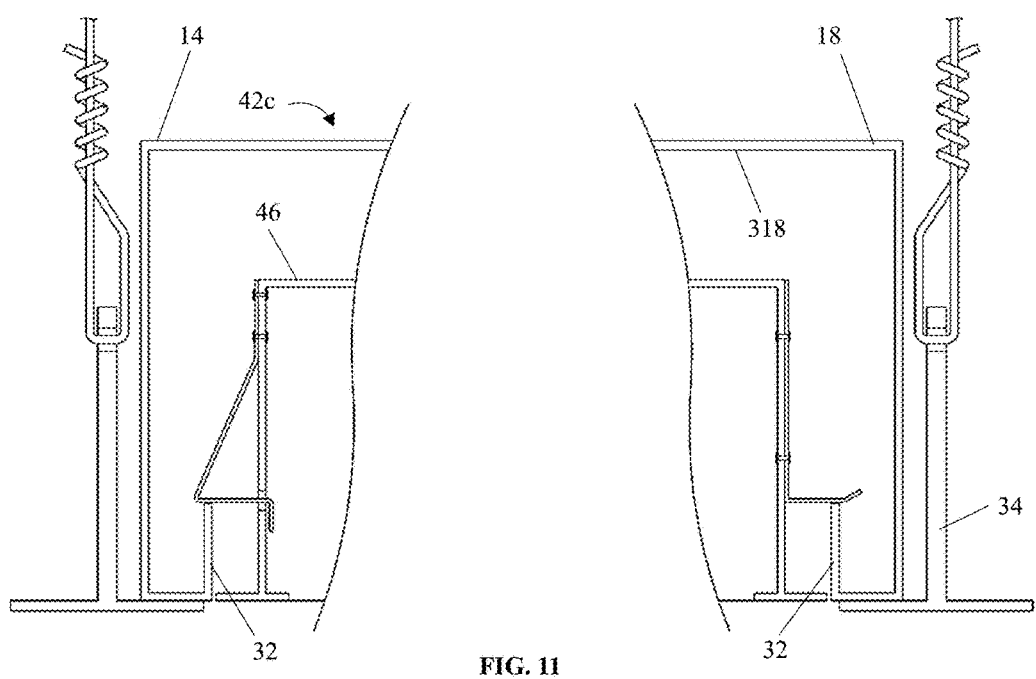
FIG. 11 depicts a cross-sectional side view of a fourth embodiment of the present kits.

Referring now to FIG. 11, shown is one embodiment 42c of the present kits (e.g., depicted in a similar fashion as FIG. 4A). Kit 42c comprises a troffer 318 configured to be coupled to a T-bar frame 34 of a suspended ceiling (e.g., for new installation). Troffer 318 can be similar, in many respects, to troffer 10. In the embodiment shown, troffer 318 comprises a vertical wall portion 32. Vertical wall portion 32 may increase structural rigidity of troffer 318 and is configured to have a height such that vertical wall portion 32 can function as descried above for protrusion 82 of mounts 66a, 66b, and/or 66c (e.g., to support frame 46 via coupling members, for example, coupling members 62a and/or 62b). In the embodiment shown, both first end 14 and second end 18 of troffer 318 comprise a vertical wall portion 32, however, in other embodiments where at least one end of frame 46 is configured to be supported within the troffer by a coupling member that may not require such a shelf portion (e.g., coupling member 62c of FIGS. 6A-6C), vertical wall portion 32 need not be present on that end. Troffer 318 can be separately manufactured, or can comprise a modified existing troffer.

Figure 12:
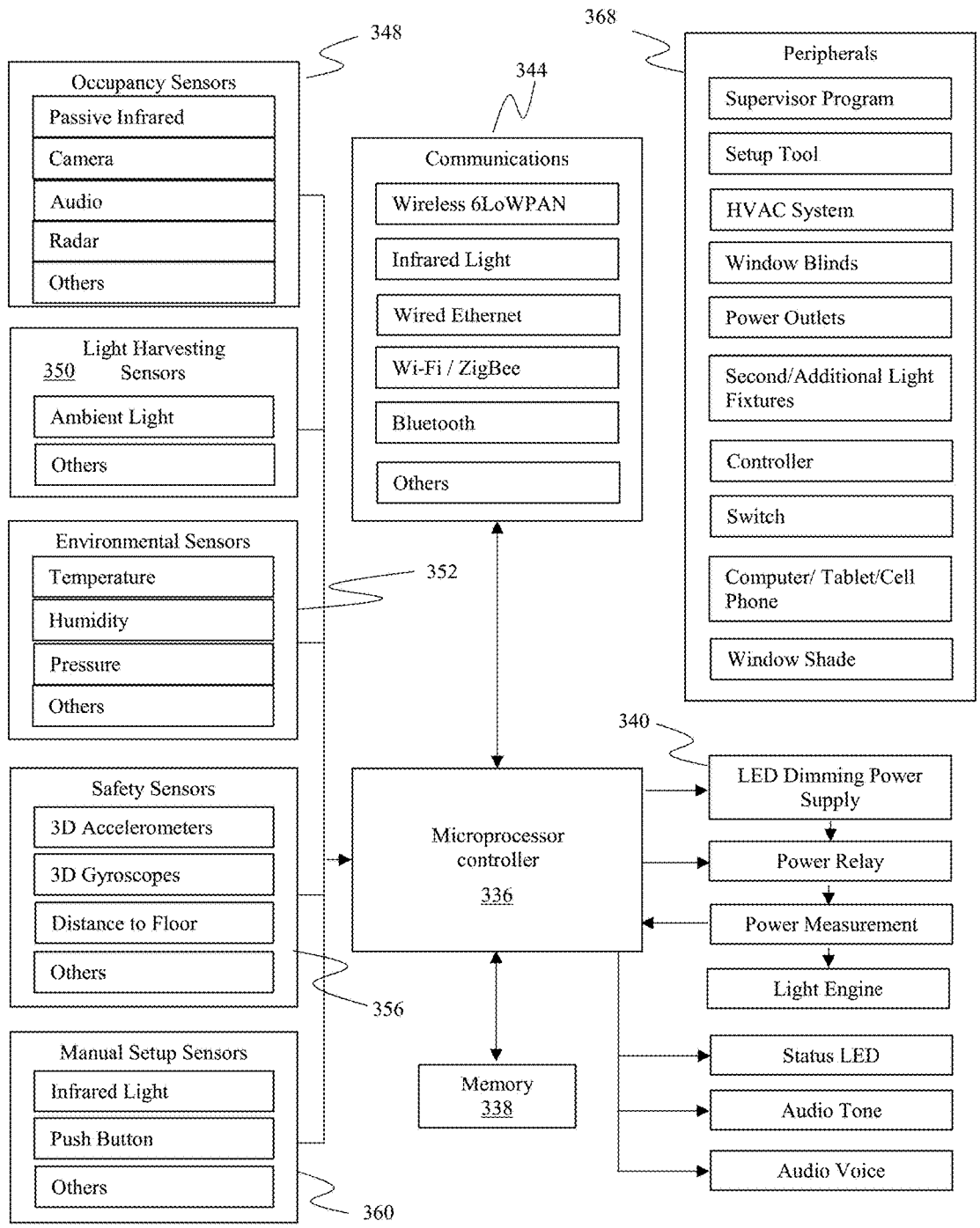
FIG. 12 is a block diagram of certain components of some of the present embodiments.
Figure 13:
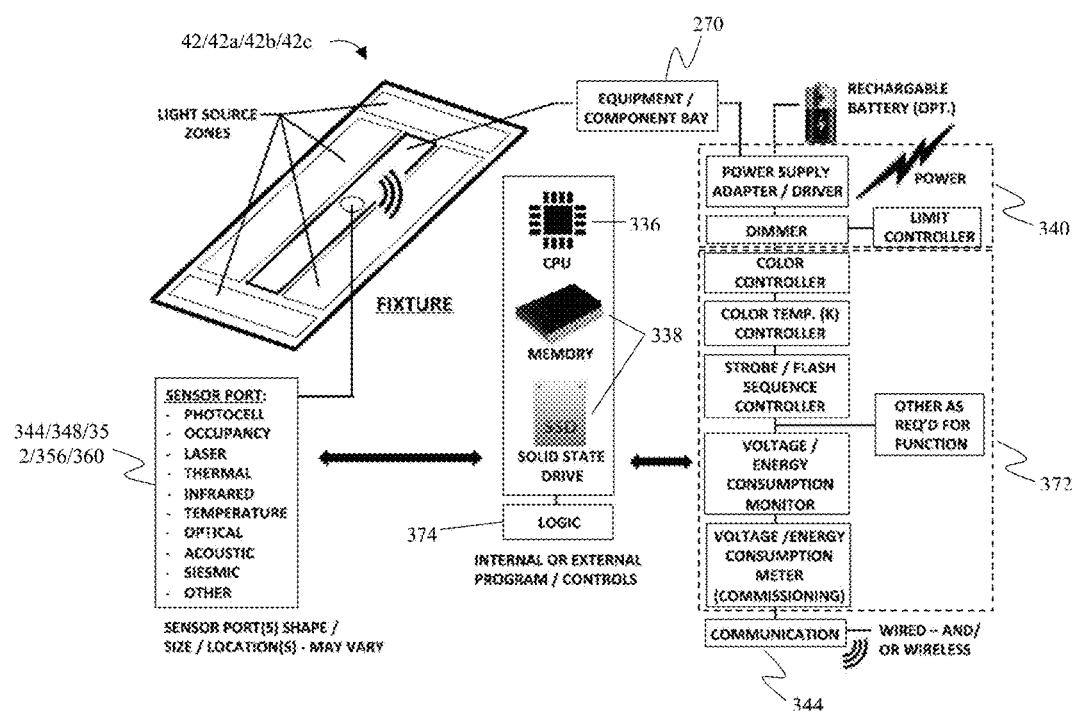
FIG. 13 is a conceptual diagram showing certain components of FIG. 12.

FIG. 12 depicts a block diagram representation of an example of some components and features of some of the present retrofit kits and/or frames (also referred to as "fixtures"). FIG. 13 is a conceptual diagram of the components and features of FIG. 12. FIGS. 12 and 13 correspond to a kit or light fixture in which a plurality of LEDs (e.g., light sources) are coupled to the frame (e.g., the same and/or similar to as described for retrofit kit 42 with respect to FIG. 8B). In the embodiment shown, kit 42 further comprises a processor 336 (e.g., a microprocessor) coupled (e.g., configured to be in electrical communication with) the plurality of LEDs, and configured to control the operation of the LEDs (e.g., at least through operation of at least LED dimming power supply 340). Further control over the LEDs can be provided by LED control components 372 (e.g., as shown in FIG. 13), including controllers (e.g., color, temperature, strobe/flash sequence, and/or the like controllers), and voltage/energy consumption monitors and/or meters. Any one of LED control components 372 may be separate components, or be unitary with processor 336. In some embodiments, the present kits further comprise a memory 338 (e.g., random access memory (RAM), flash memory, and one or more hard disk drives, and/or solid state drives, and/or the like). In these embodiments, pre-set features and/or functions can be programmed and stored into memory 338 (e.g., as logic 374, for example, comprising processor executable computer instructions and/or pre-defined variable values, described in more detail below). In some embodiments (e.g., kit 42), the present kits further comprise one or more sensors coupled to processor 336 configured to detect one or more events and/or environmental characteristics. For example, suitable sensors may comprise occupancy sensors 348, light (e.g., light harvesting) sensors 350, such as photocells or ambient light sensors, environmental sensors 352, safety sensors 356, manual setup sensors 360, metering/monitoring sensors (e.g., for commissioning, performance monitoring, lumen maintenance, data collection, analysis, reporting, and/or the like, and/or the like), which may form part of a "Metering/Monitoring kit" for and/or included with the present fixtures, and/or the like.

In some embodiments (e.g., kit 42), the present kits further comprise a communications device 344 (e.g., a wireless transceiver) configured to communicate with various peripherals 368 (e.g., as part of a "smart" network). Suitable communications protocols include, but are not limited to, Wi-Fi, infrared, ZigBee, Bluetooth, satellite protocols, local area network (LAN), wide area network (WAN), radio, cellular, and/or the like, and may include any suitable communications protocol now known or later developed. Communications can further be secured (e.g., encrypted, for example, by processor 336) to prevent unauthorized control of the present kits. In embodiments comprising communications device 344, remotes (e.g., which may form part of a "programming kit" for and/or included with some of the present fixtures) can be provided to allow a user to control the light source (e.g., LEDs) directly, for example, a user can communicate a command to processor 336 (e.g., to adjust the lighting in the environment, for example, when performing a task requiring a higher or lower level of lighting or when entering or exiting the environment) (e.g., an infrared, Wi-Fi, laser, Bluetooth, and/or the like signal), and processor 336 can communicate the command (and/or ignore and/or modify the command based on characteristics detected by sensors) to LED dimming power supply 340 to effectuate changes in lighting. Such user control functionality can be accomplished in separate and/or additional ways, for example, through user commands sent over Wi-Fi, or through laser-based remotes. Some embodiments are configured to communicate in a wired fashion (e.g., alone or in addition to wirelessly), for example, through Ethernet cables. In the embodiment shown, peripherals 368 can include a variety of components, including, but not limited to, supervisor program(s) (e.g., running via processor 336 and/or other external, to the light fixture, processor(s)), setup tools, heating ventilation, and air conditioning (HVAC) systems (e.g., HVAC damper or other controller), window blinds and/or shades (e.g., controlled by one or more relays), power (e.g., electrical) outlets, second and/or additional light fixtures and/or groups and/or subgroups of light fixtures, controllers, switches, user-operated (or otherwise) devices such as computers, tablets, cell phones or similar mobile devices, and/or the like, and/or the like.

FIG. 14A-14E depicts various switches and/or controls which can be used with some embodiments of the present kits (e.g., 42) and/or fixtures. These examples are provided only by way of illustration and not by way of limitation. As shown, the present fixtures (e.g., 42) can be configured to be in electrical communication with a conventional wall switch (e.g., 376a and/or 376b) that is in electrical communication with mains 375 (e.g., FIGS. 14A and 14B). Conventional wall switches can include on and off switches, dimmers, and/or the like (e.g., as shown). In embodiments configured to work with wall switches that may not comprise dimmers (e.g., FIG. 14B), dimming can be controlled through a controller (e.g., 377a, which may be on board light fixture, for example, processor 336, and/or external to the light fixture, a server and/or a different light fixture operating in a "master" configuration). In some embodiments, a wall switch need not be present, and a controller (e.g., 377b) can perform on and off operations, dimming, and/or the like (e.g., FIG. 14C). The present kits can also be configured to work with a controller (e.g., 377a) with substantially only dimming control (e.g., 14D). In such kits, the light fixture may treat dimming commands from controller 377b additionally as an on and off command (e.g., in a dim to off fashion, if, for example, controller 377b sends a dimming signal at or near 0 V).

Figure 15A:
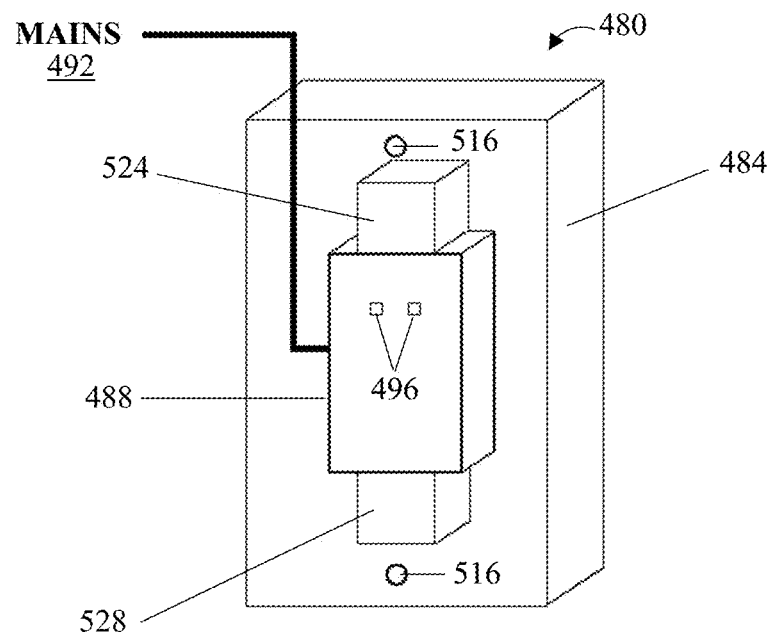
FIGS. 15A-15C depict various views of one embodiment of a switch suitable for use with some of the present embodiments.
Figure 15B:
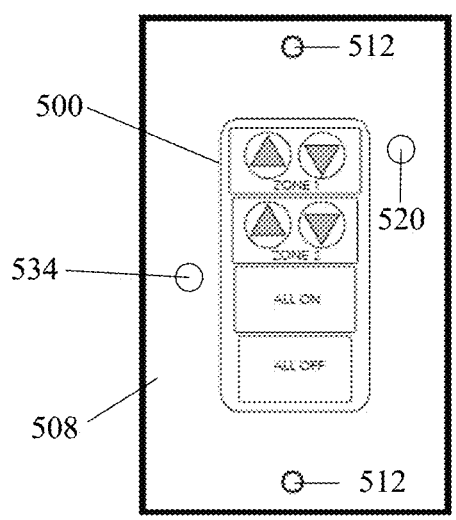
Figure 15C:
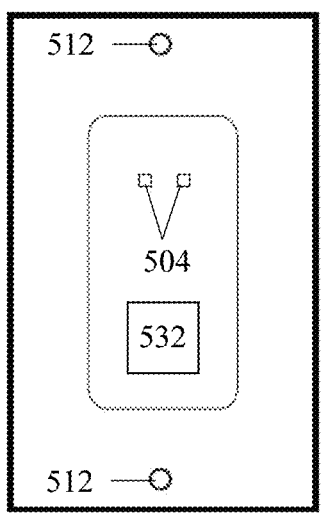

FIGS. 15A-15C depict various views of one embodiment 480 of a switch which may be suitable for use with some, if not all, of the present kits and/or fixtures (e.g., alone or in combination with other kits, fixtures, and/or components). In the embodiment shown, switch 480 comprises a junction box (e.g., gang box) 484. Junction box 484 can be an existing junction box (e.g., in which the electrical components of switch 480 can be installed), or can be provided as a part of the present switches (e.g., with electrical components pre-installed). Additionally, while the components of switch 480 are shown within a single junction box, other embodiments of the present switches can be included in more than one junction box (e.g., 2, 3, 4, or more junction boxes). In the embodiment shown, switch 480 further comprises a transformer 488 disposed in junction box 484 (e.g., integrated with switch 480) and configured to receive line voltage (e.g., relatively high voltage, for example, from mains 492). In the embodiment shown, transformer 488 is configured to receive the line voltage (e.g., through wiring, for example, disposed in a wall or ceiling) and transform the line voltage to low voltage (e.g., transformer 488 can comprise and/or function as a conventional transformer). As shown, transformer 488 further comprises at least two low voltage terminals 496 (e.g., in electrical communication with the low voltage side of the transformer).

In the embodiment shown, switch 480 comprises a low voltage user input device 500 configured to be in direct electrical communication with low voltage terminals 496. For example, in this embodiment, user input device 500 comprises two electrical connectors 504 that correspond with (e.g., match, in at least placement and/or configuration) low voltage terminals 496 such that when user input device 500 is coupled to junction box 480 (e.g., such coupling may be facilitated by faceplate 508, described in more detail below) and/or transformer 488, connectors 504 make direct contact with terminals 496. Through such features, switch 480 need not comprise any low voltage wires (e.g., the presence of both line voltage and low voltage wires within a single junction box may be prohibited by code in some locations). Connectors 504 and/or terminals 496 can comprise any suitable connectors and/or terminals, and in some embodiments, connectors 504 can be disposed on transformer 488, rather than user input device 500, which may, in these embodiments, comprise terminals 496. Suitable electrical connectors include, but are not limited to, depressible electrical connectors, such as pogo-pin, elastomeric, and/or the like connectors, conventional electrical connectors such as pins and/or contact plates, and/or the like.

In the embodiment shown, switch 480 further comprises a faceplate 508 configured to secure low voltage user input device 500 relative to junction box 484. For example, in the embodiment shown, faceplate 508 is configured to receive user input device 500 (e.g., by inserting the user input device into the faceplate from the backside, for example, as shown in FIG. 15C). Faceplate 508 may, for example, comprise a ridge and/or other protrusion configured to physically prevent the user input device from extending beyond a certain point (e.g., from being pushed through and/or falling out of the front side of the faceplate). In such embodiments, faceplate 508 with user input device 500 disposed therein can be secured to junction box 484 and/or transformer 496 (e.g., thus capturing the user input device and securing it relative to the junction box). Such securing of faceplate 508 to junction box 484 can be accomplished through any structure which permits the functionality described in this disclosure. For example, as shown, faceplate 508 and junction box 484 can comprise holes (e.g., 512 and 516, respectively) that can be configured to receive fasteners (e.g., screws, rivets, and/or the like) (e.g., such that fasteners can be inserted through holes 512 of faceplate and into holes 516 of junction box, which may be threaded). However, in other embodiments, faceplate 508 may be secured to junction box 484 through different and/or additional structure including, but not limited to, adhesives, such as glue, tape, and/or the like, interlocking features disposed on faceplate 508 and/or junction box 484, and/or the like. In yet other embodiments, faceplate 508 may be omitted entirely, and user input device 500 may possess structure for directly coupling to junction box 484 and/or transformer 496 (e.g., through structure similar to as described for coupling faceplate 508 to junction box 484).

In the embodiment shown, user input device 500 is configured to receive user input indicative of a desired lighting condition (e.g., on, more bright, less bright (e.g., dim), off, and/or the like). User input device 500 of switch 480 is shown only by way of example, and any suitable user input device can be used and/or included with the present switches. For example, structure for receiving user input can include, but is not limited to, mechanical components such as knobs, switches, sliders, and/or the like, electrical components such as touchscreens and/or the like, and/or the like. Additionally, user input device 500 may be larger (e.g., in a transverse dimension) than junction box 484. In the embodiment shown switch 480 (e.g., user input device 500) is configured to dim at least one light fixture (e.g, through components, such as processor 532 and/or communications components such as wireless transceiver 524 and/or wired communications link 528, described in more detail below). In the embodiment shown, switch 480 further comprises at least one indicator 520 (e.g., an LED indicator) configured to provide information indicative of the operational state (e.g., on, off, dim level, power consumption, connected, disconnected, fault and/or error, and/or the like) of at least one of the switch and the light fixture(s) to which the switch may be connected.

In the embodiment shown, switch 480 is configured to control at least one light fixture at least based on the user input (e.g., received from user input device 500). Switch 480 can be configured to work with many, if not all, of the present kits and/or fixtures, and/or may be configured to control groups of fixtures. In the embodiment shown, switch 480 comprises a wireless transceiver 524 (e.g., configured to communicate wirelessly with light fixture(s) and/or other component(s)) (e.g., to transmit commands to light fixture(s) and/or components(s) based on, for example, user commands received from user input device 500). Wireless transceiver can comprise any suitable structure and/or component, including those discussed above with reference to FIG. 12 and/or the like. For example, wireless transceiver 524 can operate over radio frequencies (e.g., similar to a conventional garage door opener, and may be modified to increase signal clarity by, for example, changing the pulse timing of the signal to repeat high frequencies). Switch 480 additionally comprises a wired communication link 528 which can perform the same or similar functions as wireless transceiver 524 (e.g., to function as a back-up and/or a more secure and/or robust communications link). Some embodiment of the present switches may include either wireless transceiver 524 or wired communications link 528, but not necessarily both.

Switches (e.g., 480) and fixtures (e.g., or groups of switches and/or groups of fixtures), in some embodiments, may be married to one another (e.g., through pairing) (e.g., such that switch(es) can control only those fixture(s) to which they are married, in other words, connected to). User commands communicated by switch 480 can be performed by connected fixture(s) or component(s), for example, by overriding automatic logic, or commands can be ignored (e.g., if fixture and/or component logic determines a user command is wasteful of energy). Additionally, such user inputs may be used to modify fixture and/r component logic, for example, to re-set high end trim settings (e.g., if switch 480 is set to 50% dim, connected fixture(s) can be configured not to exceed a 50% dim setting). In the embodiment shown, switch 480 further comprises a processor 532 (e.g., shown as a component of user input device 500). In other embodiments, processor can be (e.g., alone or additionally) a component of transformer 488 and/or a separate component included within and/or outside of junction box 484. As shown, switch 480 further comprises one or more sensors (e.g., sensor 534) configured to detect one or more events or environmental characteristics. Sensors of the present switches can comprise any of the sensors discussed above with respect to FIG. 12, and/or like sensors. For example, in the embodiment shown, sensor 534 comprises an optical sensor which can be configured to detect an occupancy of an environment (e.g., an infrared sensor, a traditional motion detector, and/or a camera, for example, in communication with processor 532). In the embodiment shown, processor 532 is configured to control the operation of light fixture(s) and/or component(s) (e.g., that switch 480 is in communication with) responsive to the one or more events or environmental characteristics detected by the one or more sensors (e.g., in a similar fashion as to described below with reference to the present kits and/or fixtures).

Figure 16:
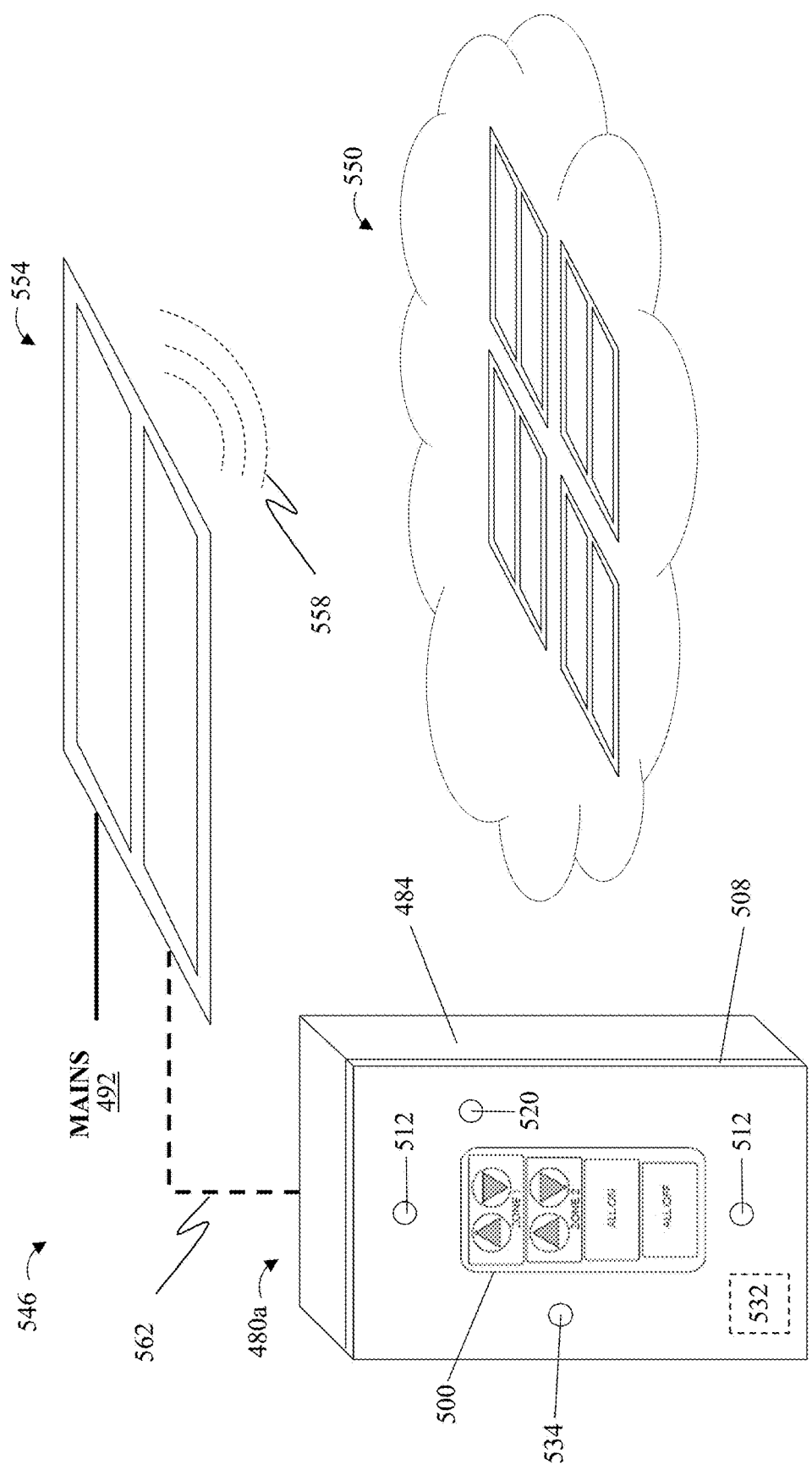
FIG. 16 depicts a system having a different switch, which may be suitable for use with some of the present embodiments.

FIG. 16 depicts one embodiment of a system 546 having a switch 480*a*, which may be suitable for use with some of the present kits and/or fixtures. Switch 480*a* can be substantially similar to switch 480, with the primary exception that switch 480*a* may not comprise a transformer (e.g., or associated components). Otherwise, switch 480*a* can comprise a junction box 484 (e.g., or be disposed within a junction box), user input device 500, faceplate 508 (e.g., with mounting structure such as holes 512), indicator 520, sensor 534, processor 532, and/or the like, and some if not all of these components can be substantially similar to or the same in structure and/or function as described above for switch 480. In some embodiments, the present switches (e.g., 480*a*) can be implemented using an existing junction box (e.g., that may comprise line voltage wires and/or components). For example, any line voltage wires and/or components can be removed from the junction box (e.g., and/or from corresponding conduits), and electrical components (e.g., user input device 500, indicator 520, processor 532, sensor 534, any communications components, and/or the like) of the switch (e.g., 480) can be placed within the junction box. In the embodiment shown, system 546 comprises a low voltage switch 480*a* having a low voltage user input device 500 configured to receive user input indicative of a desired lighting condition (e.g., as described above). Switch 480 is low voltage in that, for example, no components of switch 480*a* require line voltage (e.g., from mains 492) (e.g., switch 480*a* comprises no line voltage components). Through such features, switch 480*a* need not comprise both line voltage and low voltage wires (e.g., the presence of both line voltage and low voltage wires within a single junction box may be prohibited by code in some locations).

Figure 14A:
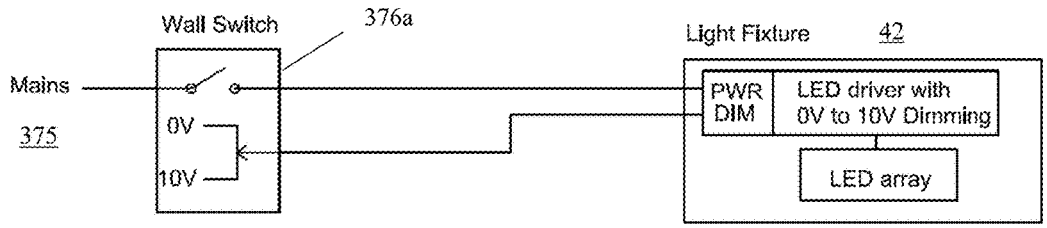
FIG. 14 is a block diagram of certain of the present switches and/or controllers.
Figure 14B:
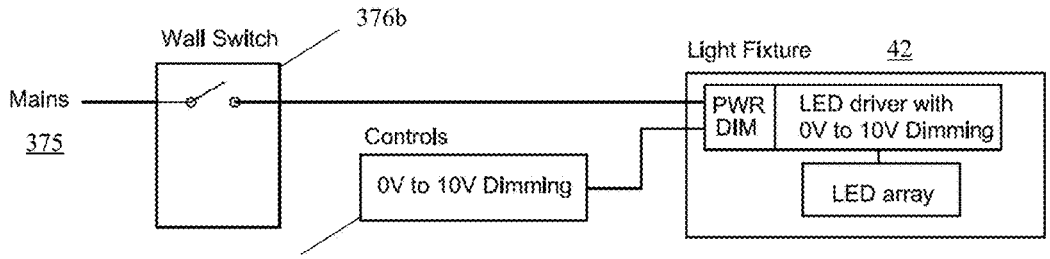
Figure 14C:
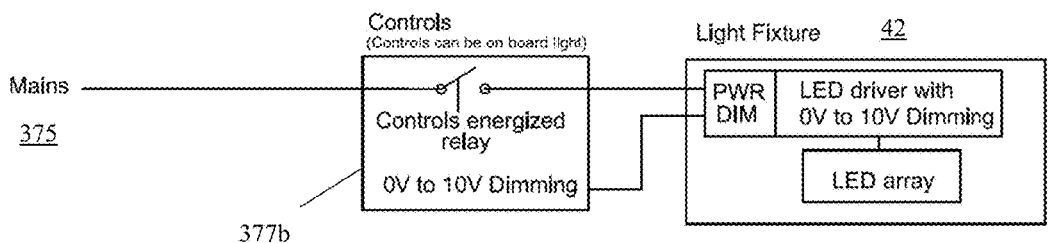
Figure 14D:
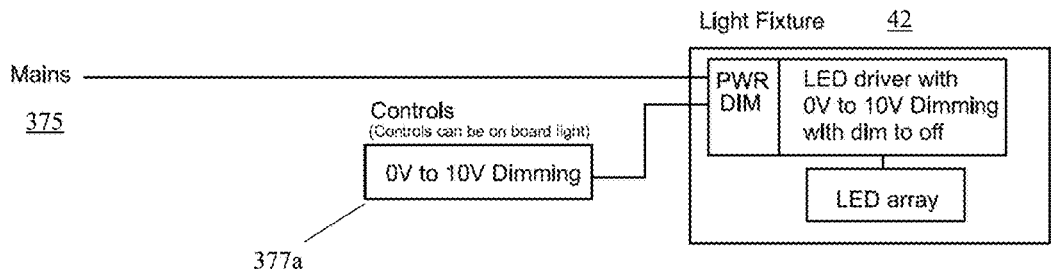
Figure 14E:
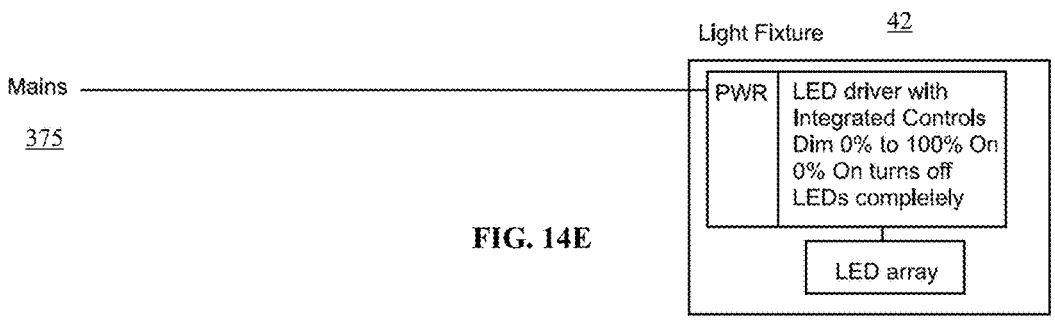

In the embodiment shown, system 546 further comprises at least one slave light fixture (e.g., a plurality of slave light fixtures 550) (e.g., kits and/or fixtures 42, 42a, 42b, 42c, and/or the like). In the embodiment shown, system 546 further comprises a master light fixture 554. Master light fixture 554 (e.g., kit and/or fixtures, 42, 42a, 42b, 42c, and/or the like) is configured to receive line voltage (e.g., through wiring, from mains 492) and can have a communications device (e.g., communications device 344, which is shown as a wireless, for example, transmitting wireless signals 558, but in some embodiments may instead or additionally be wired, for example, a wired communications device) configured to communicate with any slave fixtures 550. In the embodiment shown, master light fixture 554 is in electrical communication with low voltage switch 480a (e.g., through a low voltage wired connection 562, and the switch and the master light fixture may both comprise a wired communications link). In some embodiments, communication between the master light fixture and the switch can be wireless. In the embodiment shown, wired connection 562 can comprise CAT5E plenum cable (e.g., that can transmit at least one of power or electrical signals between master light fixture 554 and the low voltage switch). For example, master light fixture 554 can be configured to provide low voltage power to low voltage switch 480 (e.g., through a transformer, disposed on the master light fixture or between the master light fixture and the switch, configured to transform line voltage to low voltage). In the embodiment shown, wired connection 562 (e.g., or a wireless connection in other embodiments) can allow master light fixture 554 to receive user input (e.g., received by user input device 500). Master light fixture 554 can communicate the received input (e.g., through wireless signals 558) to slave light fixtures 550 (e.g., and thus control the slave light fixtures, at least based on the user input). In the embodiment shown, master light fixture 554 is the closest in a physical proximity to the low voltage switch than any slave light fixture (e.g., to minimize, for example, power transmission losses between the switch and the master light fixture). However, in other embodiments, any suitable light fixture can be designated as a master light fixture and/or any suitable fixture can be designated as a slave light fixture (e.g., and be placed under the control of any suitable master light fixture). As with other embodiments of the present disclosure, any switches and/or control features and/or components can be comprised by the fixtures (e.g., using processor 336, as opposed to an external switch, controller, processor, and/or the like) (e.g., as shown in FIG. 14E).

Figure 17:
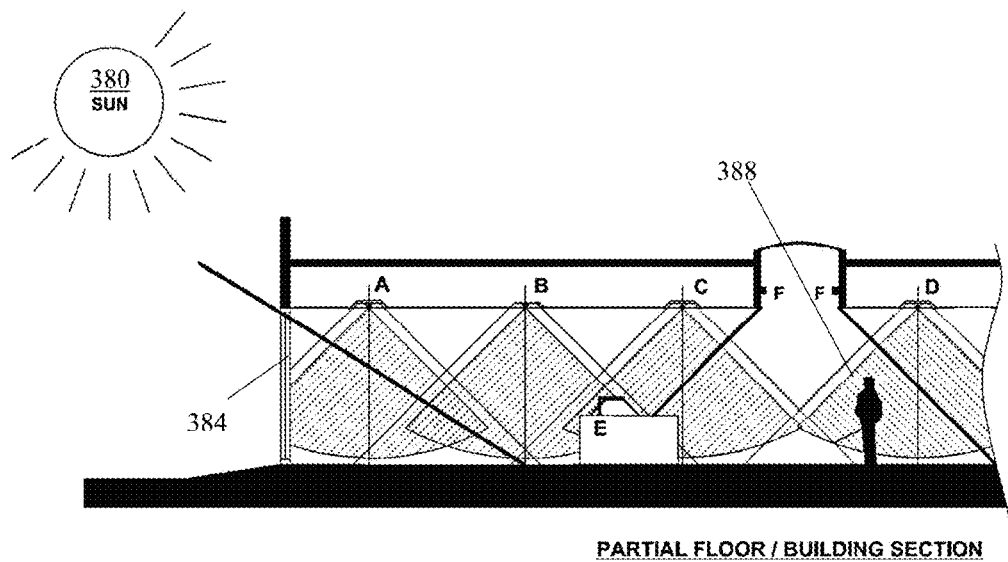
FIG. 17 depicts an example of the operation of certain functions of the present embodiments.

In embodiments with sensors, the processor can be configured to control operation of the LEDs response to one or more events or environmental characteristics detected by the one or more sensors (e.g., at least by communicating control signals to LED dimming power supply 340 based on detected characteristics). What follows are some examples of features and/or functionalities of some embodiments (e.g., 42) of the present kits. The following examples are provided for illustrative purposes only, and do not limit the scope of the present disclosure. The following examples make additional reference to FIG. 17, which depicts an example of an environment (e.g., an office and/or room) having fixtures of the present disclosure.

Light harvesting sensors 350 (e.g., which may be present on any of light fixtures A through D) (e.g., which may form part of a "Daylighting Kit" for and/or included with some of the present fixtures), such as photocells, can detect ambient light in an environment (e.g., light from sun 380 entering through window 384 and/or light from any other source). Environmental characteristics collected from light harvesting sensors can be used, for example, to control any automated window blinds and/or window shades (e.g., that may be coupled to window 384 to allow natural light in to reduce power consumption of artificial lights) (e.g., a "Window Blind Kit"). For example, ambient lighting conditions near fixture A may be brighter than at fixture B, therefore, fixture A may be set to a lower light output than fixture B, to conserve energy. For further example, if conditions at fixture A are too hot (e.g., due to, for example, solar heat gain, and as indicated, for example, by an environmental sensor 352, such as a temperature sensor, which may be present on any of light fixtures A through D), any window blinds and/or shades on window 384 can be actuated (e.g., by a processor 336, for example, of a "master" fixture, and/or by a separate processor and/or controller, which may be external to the fixtures). Through at least onboard and/or external (e.g., remote) logic, the present fixtures (e.g., fixture) can determine, for example, that energy consumption is lower when the blinds and/or shades are closed (e.g., that additional lighting demands caused by the closure of the blinds and/or shades require less energy than HVAC demands due to solar heat gain and/or the like when the blinds and/or shades are open). Light harvesting sensors in some embodiments can also be used to control fixture output to optimize Circadian rhythm of occupants that may not be exposed to natural lighting.

Occupancy sensors 348 can detect motion (e.g., ultrasonic sensors), thermal energy (e.g., infrared sensors), sound (e.g., acoustic sensors, such as microphones), and/or images (e.g., digital or other cameras) (e.g., and may form part of an "Occupancy Kit" for and/or included with some of the present fixtures). For example, cameras can be configured to detect occupancy by taking a series (e.g., at least two) images of the environment. Processor 336 can compare the images to detect changes in environment (e.g., changes in occupancy, such as a person entering or leaving the environment) (e.g., by comparing the pixel values, or pixilation, from one image with the pixel values from a second image). Occupancy sensors comprising cameras can further comprise a traditional motion detector, for example, one or more of those listed above. Through such components, the motion detector can detect motion to activate the camera-based sensors, which through communication with processor 336 can determine whether the motion detected is a result of a change in occupancy (e.g., cameras may be more accurate for detecting changes in occupancy than motion detectors, but may consume more power, therefore, it may be advantageous, but may not be necessary, for both occupancy sensors to work together as part of a system). Occupancy sensors (e.g., cameras, for example, relatively high resolution cameras, audio sensors, such as microphones, and/or the like) can also be used for security purposes (e.g., to detect an unauthorized individual in an area) (e.g., which may form part of a first level "Security Kit" for and/or included with some of the present fixtures).

Processor 336 can, for example, communicate with at least LED dimming power supply 340 to effectuate the appropriate lighting changes (e.g., if a room is detected as unoccupied, the processor can reduce lighting to conserve energy). Such an occupancy sensor can also be used in the event of an emergency (e.g., earthquake, fire, and/or the like) to communicate (e.g., notify) the logic and/or communication device(s) (e.g., in a wired and/or wireless fashion) to report the location of occupants within an environment to first responders (e.g., through communications device 344). Occupancy sensors may also be used to communicate demands to HVAC systems (e.g., unoccupied rooms may have a lower HVAC demand). Through at least occupancy awareness, facilitated through occupancy sensors 348, the present kits can be configured to cooperate with others of the present kits (e.g., in a network) to further increase lighting efficiency (e.g., minimize power consumption). For example, and with reference to FIG. 17, rings of fixtures (e.g., adjacent fixtures surrounding a given fixture) can define proximity perimeters. For example, a first level perimeter can be defined (e.g., identified by a processor 336) by a detected occupant (e.g., 388) within range of the sensors in a given fixture (e.g., the "primary fixture") (e.g., in FIG. 17, occupant 388 is underneath and/or adjacent to fixture D, which can be the primary fixture). A second level perimeter can be defined (e.g., by the processor) as those fixtures located in closest proximity to the primary fixture (e.g., those surrounding the primary fixture, for example, fixture C in FIG. 17, and a fixture to the right of fixture D, if present), and the primary fixture can identify and communicate this information to fixtures in the second level perimeter (e.g., via processor 336 and communications device 344 and/or processors and/or controllers that may be external to the fixture(s)). A third level perimeter can be defined as those fixtures surrounding the fixtures defining the second level perimeter (e.g., fixture B, and a fixture two fixtures to the right of fixture D, if present), and so on (e.g., a fourth, fifth, sixth, and higher order proximity perimeter can be defined similarly). At a determined point, fixtures in a perimeter (e.g., a fourth or higher perimeter) can be considered unoccupied, and light levels can be adjusted accordingly (e.g., less light may be required for unoccupied areas). Through at least the use of such proximity perimeters, efficient lighting can be achieved, for example, the primary fixture (e.g., fixture D) can be set at a higher output than fixtures in the second level perimeter (e.g., fixture C), fixtures in the second level perimeter (e.g., fixture C) can be set at a higher output than fixtures in the third level perimeter (e.g., fixture B), and so on (e.g., to form "light rings").

Environmental sensors 352 can include temperature sensors, humidity sensors, pressure sensors and/or the like (e.g., and may form part of a "HVAC kit" for and/or included with some of the present fixtures). Environmental characteristics captured by such sensors be used to communicate HVAC demands and/or faults (e.g., room temperature and/or humidity is too low and/or too high) to HVAC system(s) and/or HVAC personnel, which may further decrease power consumption and/or speed repairs to defective components. Environmental sensors, as with all sensors of the present kits, can be used in conjunction with other sensors. For example, environmental sensors 352 and light harvesting sensors 350 can provide environmental characteristic data to processor 336, which can then use the data to optimize lighting and HVAC to minimize energy consumption. For example, peripherals 368, such as window and/or skylight binds and/or shades (which may be controllable through wireless switches) can be actuated to minimize heat gain (e.g., as indicated by environmental sensors 350) while balancing natural day lighting (e.g., as indicated by light harvesting sensors 348). Through such features, cost savings can be optimized (e.g., through minimization of power requirements). In embodiments without sensors, similar functionality can be preprogrammed (e.g., optimal lighting and/or peripheral actuation) and stored into memory 338.

Figure 18:
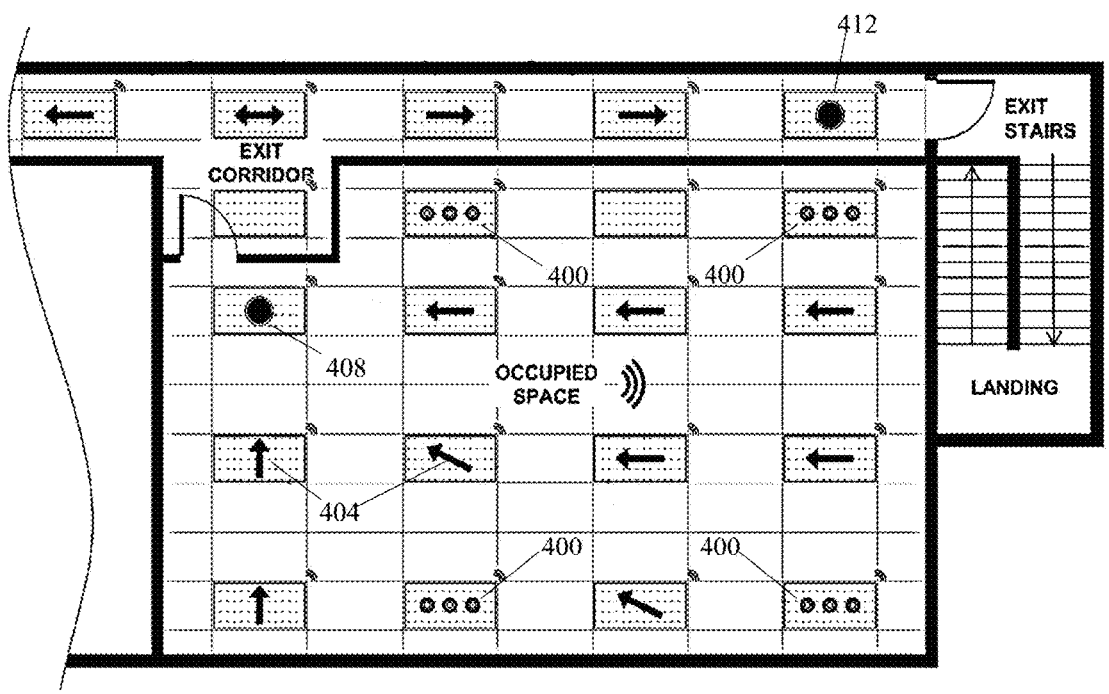
FIG. 18 depicts an additional example of the operation of certain functions of the present embodiments.

Safety sensors 356 can comprise a variety of sensors (e.g., and may form a part of a "safety kit" for and/or included with some of the present fixtures). For example, accelerometers and/or gyroscopes can detect excessive seismic or other movement to identify emergency situations. Similarly, laser distance sensors can detect the distance to a ceiling, floor, and/or wall of an environment in order to determine if a ceiling or structure collapse has occurred and/or is impending. Other traditional sensors such as smoke detectors and/or carbon monoxide detectors can also be used to detect smoke and/or other signs of fire and/or carbon monoxide levels. In the event of a detected emergency, processor 336 can use communications device 344 to notify first responders, and/or control light output to indicate an emergency situation (e.g., by flashing or strobing lights and/or illuminating a pathway to a nearest exit). FIG. 18 provides an example of such operation. As shown, during an emergency, the present light fixtures can cooperate to enhance egress and/or otherwise ensure the safety of occupants. For example, fixtures 400 near the perimeter of an area can strobe, emit red light, and/or perform any other function suitable for alerting occupants to the occurrence of an emergency. Fixtures in the interior (e.g., 404) can indicate the direction of the nearest exit (e.g., by strobing and/or flashing LEDs sequentially to indicate a direction, as shown by the arrows in FIG. 18). Fixtures directly adjacent an exit (e.g., of a given room and/or of the building), such as fixture 408, can emit green light to indicate an exit is safe. Through use of other sensors (e.g., environmental sensors 352, such as temperature sensors, smoke detectors, seismic sensors, and/or the like) fixtures can detect if an area is safe (e.g., to exit). For example if fixture 412 detects a high temperature (e.g., indicative of fire), fixture 412 can emit orange and/or red light to indicate that the exit and/or area may not be safe.

The present kits can also include different and/or additional devices. Speakers can be included (e.g., to communicate with individuals in the area, for example, during an emergency, or to play music). For another example, a combination of speakers and microphones can also be used to implement a public address (PA) system and/or to enhance security (e.g., through audio capture devices, such as microphones, alone or in combination with cameras, as described above, which may form part of a second level "Security Kit" for and/or included with some of the present fixtures). The present kits can also comprise indicators (e.g., small additional light sources, such as LEDs), which can be activated by processor 336 to confirm proper functioning of the present kits (e.g., connection with a network, receipt of commands, operating mode, such as on or off, and/or the like). The present kits may additionally comprise a battery back-up (e.g., which may form part of LED dimming power supply 340, and may have an indicator and a test button), or an inverter (e.g., in the case of a remote back-up battery or batteries) to continuously supply lighting in power-out conditions.

Some embodiments of the present kits are configured to operate in an autonomous fashion (e.g., with self-contained and integrated intelligence and communication systems, as described above). Multiple fixtures (e.g., kits) can be configured to communicate wirelessly in order to work together, using pre-set logic 374 (e.g., programmed into memory 338), programmable logic 374 (e.g., by a user and/or a technician, such that the logic is adjustable), and/or the like. As those of ordinary skill in the art will appreciate, control of the present fixture(s) and/or appropriate fixture logic can be accomplished in a variety of ways, including, but not limited to, calendar events (e.g., date and/or time), timers (e.g., conventional timers), sensor data (e.g., as described above), manual switches, pre-set logic, programmable logic, proprietary software controls (e.g., which, in some embodiments, forms a part of the present kits), third party software controls, demand response signals (e.g., from power and/or utility companies), and/or the like. By way of example, and not by way of limitation, pre-set logic (e.g., code compliance task-lighting configurations) can be programmed (e.g., stored into a memory 338) into the present fixtures and/or the present fixtures can be configured to (e.g., through wired and/or wireless communication with other fixtures and/or control components) to provide illumination (e.g., at code required performance levels) for, for example, specific occupancy characteristics and/or task lighting. For example, such spaces and tasks (e.g., that can have corresponding pre-set logic) can include, but are not limited to, open office, private office, public area (e.g., lobby, reception area, elevator lobby, and/or the like), conference room, meeting room, training room, cafeteria, lunch and/or break room, restroom, storage area (e.g., warehouse), library, utility room (e.g., information-technology room, HVAC equipment room, and/or the like), corridor (e.g., hallways, entrance and/or exit corridor, and/or the like), stairwells (e.g., exit stairwells), manufacturing room (e.g., shop, lab, assembly room, equipment room, inspection room, and/or the like), shipping and/or receiving area, parking garage, and/or the like, and/or custom areas and/or tasks. For example, some control variables can include high end trim, low end trim, fixture output (e.g., in lumens), color temperature (in Kelvins), fixture on, fixture off, dimming variables (e.g., ramp up, ramp down, ramp to off, and/or the like), ambient lighting variables (e.g., action required, stable, more light detected, less light detected, and/or the like), occupancy variables (e.g., initial occupancy detected, occupancy detected, no occupancy detected after a certain period of time, and/or the like), tuning (e.g., user controlled and/or automatic lumen maintenance as the light source degrades over time, for example, an under driving value for powering a newer light and an over driving value for powering an older light, and/or the like), proximity recognition (e.g., to objects, windows, skylights, and/or the like), strobe/flash sequences, power outlet control, electric window control (e.g., shades, blinds, and/or the like), master/slave settings, emergency lighting (e.g., emergency exit lighting), security lighting (e.g., night lights, occupant exiting assistance, and/or the like), and/or the like.

Figure 19:
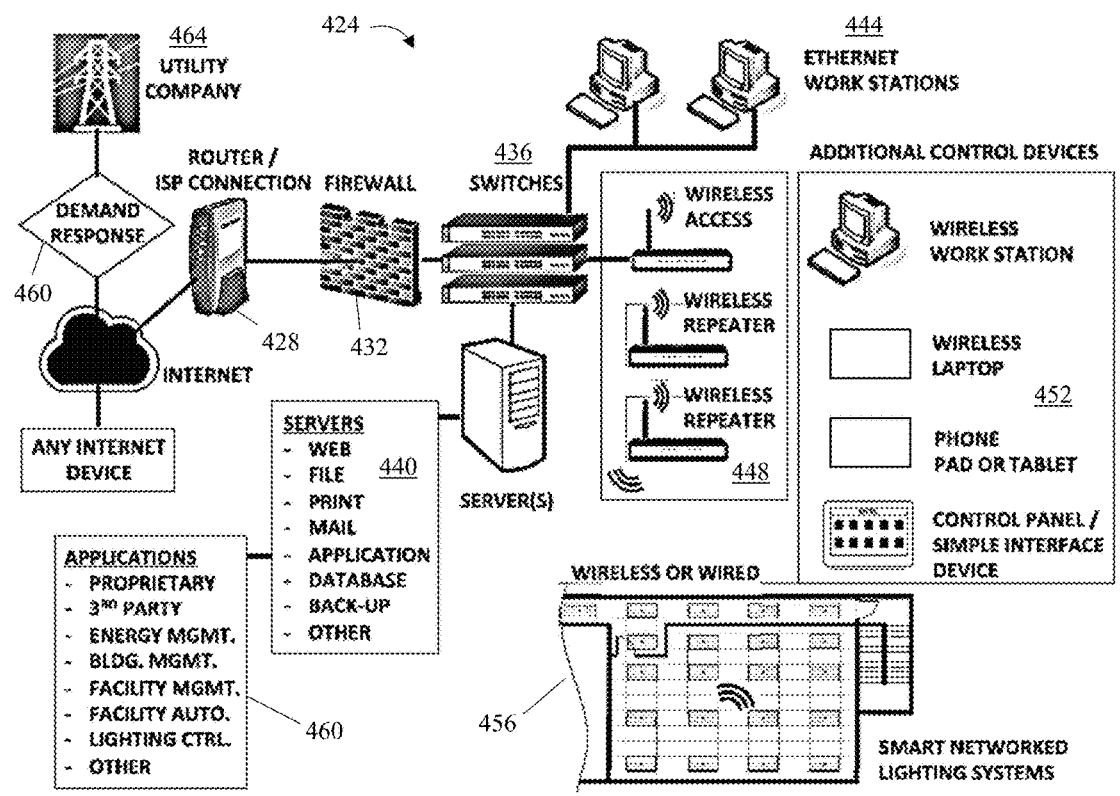
FIG. 19 depicts an example of a network environment suitable for use with some embodiments of the present kits.

FIG. 19 depicts some components of a network suitable for use with some embodiments of the present kits (e.g., 42). Network 424 is traditional in that it comprises an ISP connection 428, a firewall 432, various switches 436 (e.g., for wired network connection to servers 440 and Ethernet work stations 444), as well as wireless network hardware 448 for broadcasting a Wi-Fi network (e.g., to connect wireless devices 452). As shown, embodiments of the present kits (e.g., or a group 456 of the present kits, also known as a "smart networked lighting system") can be configured to communicate over a Wi-Fi network can be configured to communicate wirelessly (e.g., comprising a Wi-Fi communication device 344) and/or through a wired connection (e.g., comprising an Ethernet communication device 344). Control software for group 456 can be embedded on a fixture (e.g., a "master" fixture), and/or be run by a server 440 as an application (e.g., remote to the fixture(s)). Through such connectivity, the group of lights is able to respond to various conditions (as described above) (e.g., in the example shown, to generate a unified response to a demand response 460 from a utility company 464).

Some of the present methods of retrofitting a light fixture (e.g., frame 46) into a rectangular troffer (e.g., 10) with first and second ends (e.g., 14 and 18, respectively) each having a vertical wall portion (e.g., 22) and a lower horizontal shelf portion (e.g., 30) extending inward from the vertical wall portion toward the other of the first and second ends, inner surfaces of the vertical wall portions separated by a first distance (e.g., 26) comprise: coupling a first end of a frame for a light fixture (e.g., end 50 of frame 46) to the first end of the troffer via a mounting member (e.g., 62*a*, 62*b*, 62*c*, and/or the like) coupled to the frame and configured to extend beyond the first end of the frame to support the frame relative to the first end of the troffer (e.g., as shown in FIGS. 2, 4A, 5A-5C, 6A-6C, and/or 11), coupling a second end of a frame (e.g., end 54 of frame 46) for a light fixture to the second end of the troffer via a mounting member (e.g., 62*a*, 62*b*, 62*c*, and/or the like) coupled to the frame and configured to extend beyond the second end of the frame to support the frame relative to the second end of the troffer (e.g., similar to as described above).

Some of the present methods further comprise coupling a first mount (e.g., 66*a*, 66*b*, 66*c*, and/or the like) to an inner surface of the vertical wall portion (e.g., 22) of the first end (e.g., 14) of the troffer (e.g., 10) and coupling a second mount (e.g., 66*a*, 66*b*, 66*c*, and/or the like) to an inner surface of the vertical wall portion (e.g., 22) of the second end (e.g., 18) of the troffer, where each mount has a mounting surface (e.g., 78) facing the inner surface of the respective vertical wall portion (e.g., 22) and a protrusion (e.g., 82) extending to an inner end (e.g., 86) spaced from the mounting surface by a protrusion depth (e.g., 92) such that a distance (e.g., 94) between mounts on opposing ends of the troffer define a mount-opening length (e.g., 58) that is equal to or less than: the first distance (e.g., 26) less twice the protrusion depth (e.g., 92) and where the first mounting member (e.g., 62*a*, 62*b*, and/or the like) is coupled to the first end (e.g., 14) of the troffer via contact with the protrusion (e.g., 82) of the mount (e.g., 66*a*, 66*b*, 66*c*, and/or the like) coupled to the first end of the troffer, and the second mounting member (e.g., 62*a*, 62*b*, and/or the like) is coupled to the second end (e.g., 18) of the troffer via contact with the protrusion of the mount (e.g., 66*a*, 66*b*, 66*c*, and/or the like) coupled to the second end of the troffer. In some of the present methods, a cable (e.g., 202) is coupled to a frame (e.g., 46) and to a tab (e.g., 206) at a point between first and second ends of the cable (e.g., as shown in FIG. 7A) and further comprise coupling the cable to the troffer (e.g., 10). In some of the present methods, the coupling the cable (e.g., 202) to the troffer (e.g., 202) includes inserting the tab (e.g., 206) through an opening in the troffer and rotating the tab to prevent the tab from being retracted through the opening. In some of the present methods, the tab (e.g., 206) includes a hole (e.g., 222) configured to receive a screw for coupling the tab to a troffer (e.g., 10) and coupling the cable (e.g., 202) to the troffer includes inserting a fastener through the hole in the tab and into a portion of the troffer.

Figure 20A:
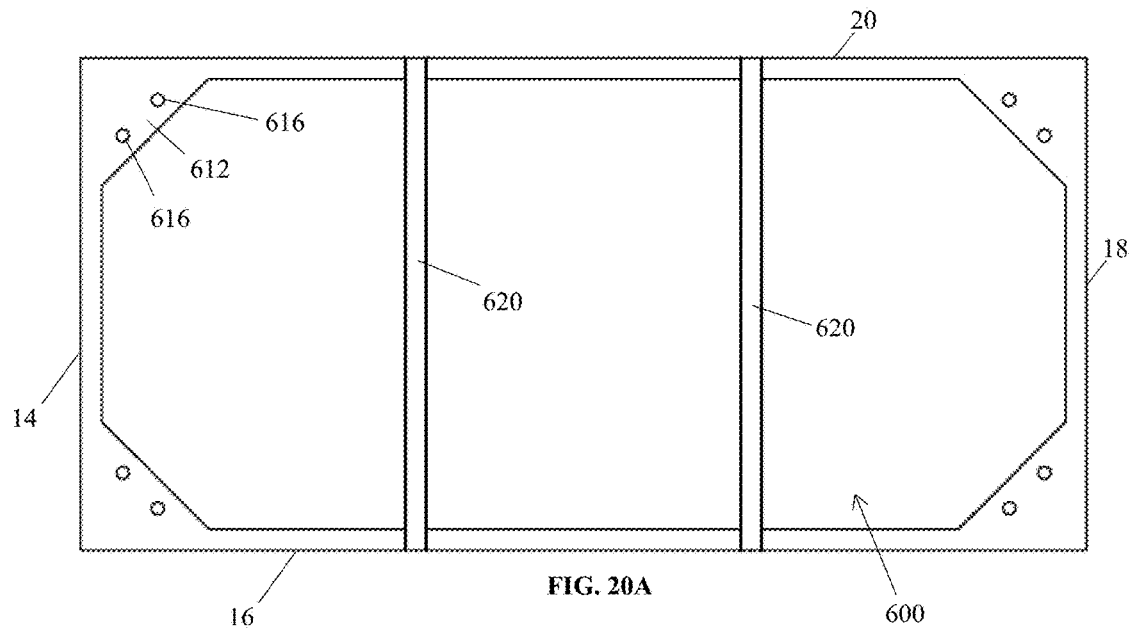
FIG. 20A depicts a plan view of one of the present open-top troffers.
Figure 20B:
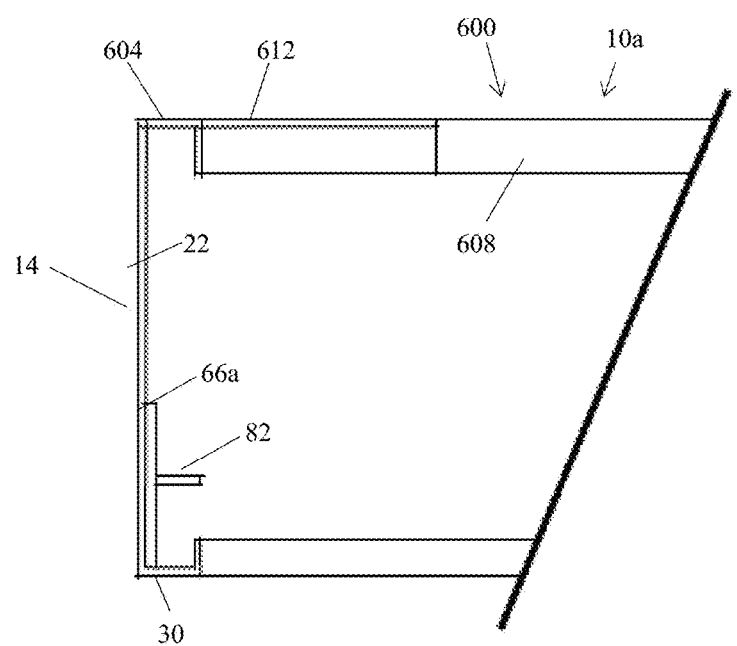
FIG. 20B depicts a partial cross-sectional view of the troffer of FIG. 20A.

Referring now to FIGS. 20A-20B, FIG. 20A depicts a plan view of one of the present open-top troffers 10*a*, and FIG. 20B depicts a partial cross-sectional view troffer 10*a*. Troffer 10*a* is similar in some respects to prior art troffer 10 with several exception. For example, in the embodiment shown, troffer 10*a* has first and second ends, 14 and 18, respectively, each having a vertical wall portion 22 (separated by a first distance 26, as described above with reference to FIGS. 2A-2B). By way of further example, in the embodiment shown, each vertical wall portion 22 of troffer 10*a* also has a lower horizontal shelf portion 30 (which can be configured to rest against and/or be coupled to a T-bar frame (e.g., 34) of a suspended ceiling grid, as described above with reference to FIGS. 2A-2B). As also depicted in FIG. 1 but not explicitly described above for troffer 10, troffer 10*a* includes first and second sides 18 and 20, respectively, extending between ends 14 and 18, and a lower end (at lower shelf portion 30) that is configured to be coupled to a T-bar (e.g., 34) frame of a suspended ceiling, and an upper end 600 spaced apart from the lower end. In some embodiments, at least 25% of the upper end (of a planar area bounded by ends 14 and 18 and sides 16 and 20 or by vertical projections of ends 14 and 18 and sides 16 and 20) is open. For example, in the embodiment shown, a majority (e.g., 75% or more) of upper end 600 is open. In this embodiment, the open nature of top 600 permits access to the space above troffer 10*a* during installation of the troffer and/or of the light fixture or frame (e.g., 46, 46*a*, 46*b*). For example, an installer can stand on a ladder with his or her head above top 600 of the troffer to run and/or connect wires.

In this embodiment, troffer 10*a* includes one or more sheets of metal defining ends 14 and 18 and sides 16 and 20, and portions of the one or more sheets of metal are bent inward to define an upper lip 604 and downward to define an inner lip 608, as shown, such as, for example, to provide structural rigidity to the troffer. In this embodiment, upper lip 608 includes triangular portions 612 at corners between adjacent ones of the ends and sides, such as, for example, to provide additional structural rigidity and to provide connection points (e.g., holes 616) for connection of earthquake straps or wires to the troffer, as described below with reference to FIG. 22. In some embodiments, troffer 10*a* also includes one or more (e.g., two, as shown) braces 620 extending from side 16 to side 20 between the first and second ends. In other embodiments, braces 620 are omitted.

In the embodiment shown, troffer 10*a* includes first and second mounts 66*a*, as described above for troffer 10. In other embodiments, protrusion or shelf 82 may be formed as a unitary part of the material (e.g., sheet(s) of metal) that defines the walls at ends 18 and 22. For example, in some embodiments, a sheet of metal defines each end wall and a protrusion or shelf 82 can simply be bent inward from each end wall without requiring separate mounts 66*a* to be coupled to the ends of the troffer.

Figure 21:
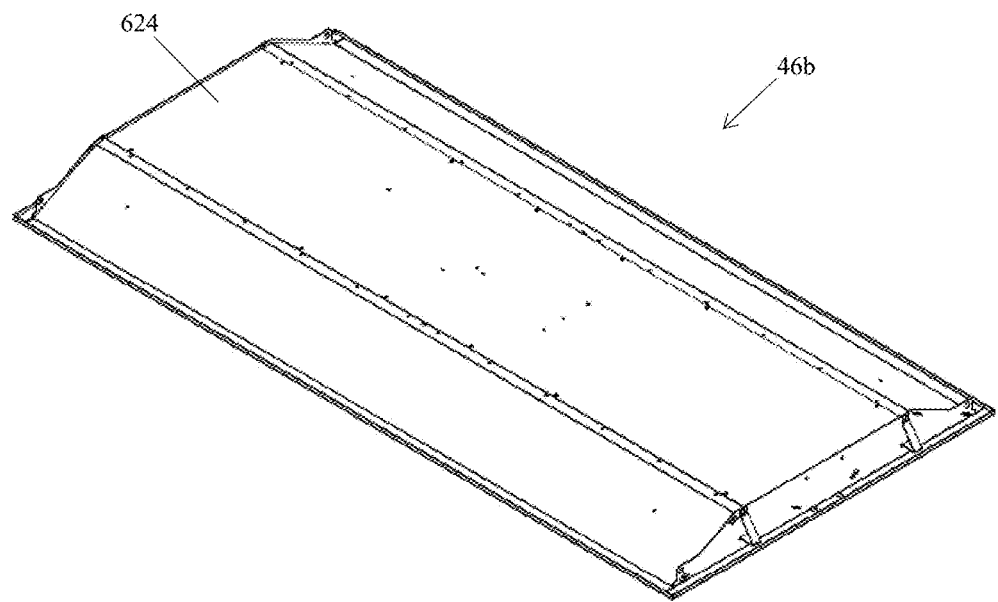
FIG. 21 depicts an upper perspective view of one of the present frames with an enclosed space for electrical components.

FIG. 21 depicts an upper perspective view of one of the present frames 46*b*. Frame 46*b* is substantially similar to frames 46 and 46*a*, with the primary exception that frame 46*b* defines an enclosed space within which electronic components can be enclosed (e.g., to meet the requirements of one or more building codes that electrical components of a light fixture be enclosed) independent of a troffer. For example, in the embodiment shown, frame 46*b* includes a piece 624 (e.g., a fifth piece) of sheet metal extending between the tops of inverted channels 230, to substantially enclose the space between the tops of the inverted channels independent of a troffer, as illustrated, for example, in FIG. 22. Piece 624 may be coupled to the rest of frame 46*b* after wires are connected to electronic components substantially enclosed in frame 46*b* or piece 624 may include an access opening configured to be covered (e.g., a panel with a tab on a first side and a screw on the other side, as is known in the electrical arts).

Figure 22:
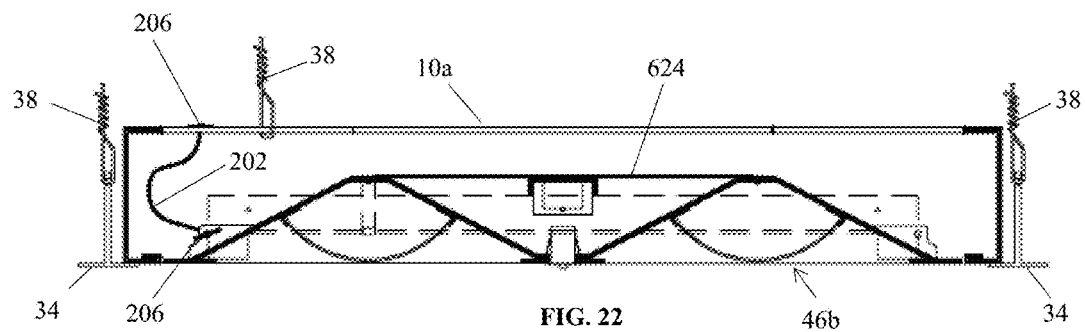
FIG. 22 depicts an end cross-sectional view of the frame of FIG. 21 disposed in the troffer of FIG. 20A.

FIG. 22 depicts an end cross-sectional view of frame 46*b* disposed in troffer 10*a*. As shown, troffer 10*a* can be coupled to T-bar frame 34 in similar fashion as described above for troffer 10. Additionally, given the open top 600 of troffer 10*a*, an additional suspension member 38 (e.g., wire) can be threaded through one of holes 616 to provide additional security for troffer 10*a* in the event of an earthquake or the like). Frame 46*b* can then be coupled to troffer 10*a*, such as, for example, via a cable 202 with a tab 206 on a first end of cable 202 pushed through one of holes 616 in troffer 10*a* and another tab 206 on a second end of cable 202 pushed through a hole in a tab or other part of frame 46*a*, as shown. Wiring connections can be made while frame 46*b* is suspended by cable 202. After the electrical components in frame 46*b* are connected, the frame can be pressed into place as described above such that mounting members 62*a* and 62*b* contact the respective mounts 62*a* to support frame 46*b* relative to troffer 10*a*.

Figure 23:
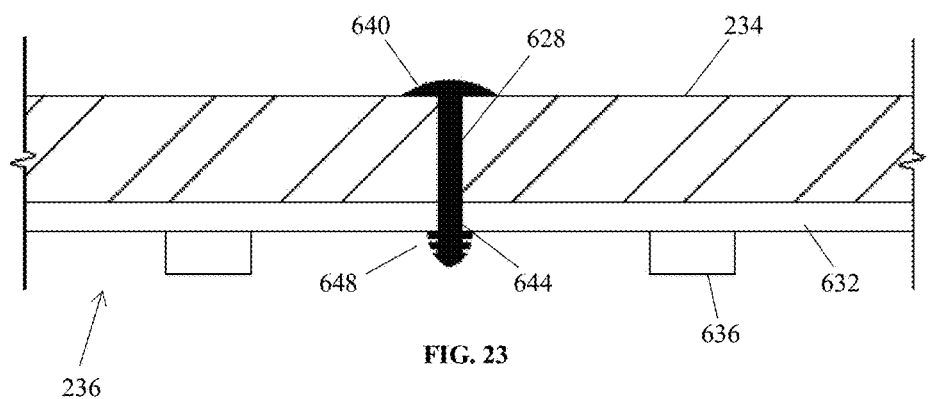
FIG. 23 depicts a partial cross-section view illustrating one of the present methods of assembling an LED light fixture with a tree plug coupling a printed circuit board (PCB) to a frame.
Figure 24:
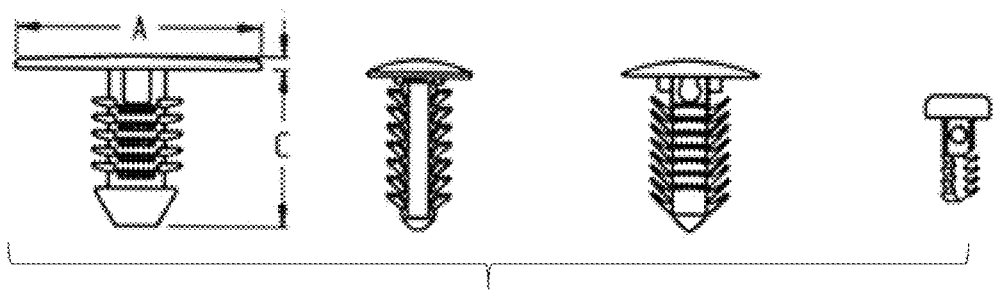
FIG. 24 depicts side views of a plurality of tree plugs that can be used in the present methods and apparatuses.

Referring now to FIGS. 23-24, FIG. 23 depicts a partial cross-section view illustrating one of the present methods of assembling an LED light fixture with a tree plug coupling a printed circuit board (PCB) to a frame, and FIG. 24 depicts side views of a plurality of tree plugs that can be used in the present methods and apparatuses. In the embodiment shown, a tree plug 628 is inserted through a first hole in a printed circuit board (PCB) 632 having at least one LED 636 and through a second hole in a frame 46*b* of a light fixture to couple the PCB to the light fixture. For example, in the embodiment shown, PCB 632 is coupled to location 236 at upper end 234 of one of the inverted channels of the frame. In the embodiment shown, tree plug 628 has a head portion 640 and a shaft portion 644, with the shaft portion having a flexible portion 648 (e.g., angled toward head portion 640 to resist removal of tree plug 628) that defines a maximum outer transverse dimension of the shaft portion, the flexible portion biased outwardly and configured to be compressed or deflected inward to reduce the outer transverse dimension of the shaft portion. As such, tree plug 628 is configured to be pressed through the respective holes by hand such that the tree plug will resist removal and thereby hold PCB 632 in close relation to frame 46*b*, as shown. The ability to manually insert tree plugs 628 to couple the PCB (or other component to which the LED(s) are coupled) to the frame can significantly reduce time and ease of assembly.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A kit for retrofitting a light fixture into a rectangular troffer with first and second ends each having a vertical wall portion and a lower horizontal shelf portion extending inward from the vertical wall portion toward the other of the first and second ends, inner surfaces of the vertical wall portions separated by a first distance, the kit comprising:
 a frame for a light fixture, the frame configured to support one or more light sources, the frame having a first end, a second end, and a frame length extending between the first and second ends;
 a first mounting member coupled to the frame and configured extend beyond the first end of the frame and be removably coupled to the first end of the troffer to support the frame relative to the first end of the troffer;
 a second mounting member coupled to the frame and configured to extend beyond the second end of the frame and be removably coupled to the second end of the troffer to support the frame relative to the second end of the troffer;
 two or more mounts, each having a mounting surface and a protrusion extending to an inner end spaced from the mounting surface by a protrusion depth, each mount configured to be coupled to an inner surface of the vertical wall portion of one of the first and second ends of the troffer such that a distance between mounts on opposing ends of the troffer define a mount-opening length that is equal to or less than the first distance less twice the protrusion depth;
 where the first mounting member is configured to contact the protrusion of one of the mounts coupled to the first end of the troffer to support the first end of the frame,
 where the second mounting member is configured to contact the protrusion of another one of the mounts coupled to the second end of the troffer to support the second end of the frame,
 where at least a portion of the second mounting member is configured to move between an extended first position and a retracted second position in which a distance between the first end of the frame and a distal end of the second mounting member is less than the mount-opening length,
 where the second mounting member is biased toward the extended first position,
 where the second mounting member comprises a spring with an upper end fixed to the exterior of the second end of the frame and a lower end movable relative to the second end of the frame, and
 where the lower end of the spring extends through an aperture in an end wall of the frame into an interior of the frame such that a user can pull the lower end of the spring toward the first end of the frame to move the second mounting member to the retracted second position.

2. The kit of claim 1 where the two or more mounts each comprise a first planar portion having a lower end and an upper end and defining the mounting surface on a first side between the upper and lower ends, and the protrusion extends outwardly from a second side and defines a shelf spaced from the lower end.

3. The kit of claim 2, where each end of the troffer includes an interior, second vertical wall portion extending upward from an inner end of the respective horizontal shelf portion, and the shelf of each mount is spaced above the lower end of the mount by a distance at least as great as the height of the inner vertical wall positions of the ends of the troffer.

4. The kit of claim 1, where the frame defines an inverted channel having a cross-sectional shape that includes an upper end, a lower end that is wider than the upper end, and first and second sides between the upper end and the lower end, the frame configured to receive one or more light sources in the inverted channel, the kit further comprising:
 a plurality of lens tabs coupled to the frame and extending into the inverted channel from each of the first and second sides between the upper and lower ends;
 one or more shelves coupled to the frame and extending inward toward a vertical plane bisecting the inverted channel from a point that is at the lower end or between the lower end and the plurality of lens tabs;
 where the lens tabs and shelves are configured to support a lens between any of:
 the one or more shelves independent of the lens tabs;
 one or more of the lens tabs and the one or more shelves; or
 the plurality of lens tabs independent of the one or more shelves.

5. The kit of claim 1, where the frame:
 defines a plurality of inverted channels each having a cross-sectional shape that includes an upper end, a lower end that is wider than the upper end, and first and second sides between the upper end and the lower end, the frame configured to receive one or more light sources in each inverted channel; and
 includes a sensor bay disposed between two of the inverted channels and having a mounting location configured to be coupled to one or more sensors;
 where the frame is configured to be coupled to a plurality of lenses such that (1) each lens encloses at least a portion of a different one of the inverted channels, and (2) none of the lenses cover the mounting location.

6. The kit of claim 1, where the frame:
 defines a plurality of inverted channels each having a cross-sectional shape that includes an upper end, a lower end that is wider than the upper end, and first and second sides between the upper end and the lower end, the portions of the frame defining the first and second sides of the cross-sectional shape having reflector surfaces facing the channel, the frame configured to receive one or more light sources in each inverted channel; and
 includes a component bridge configured to be coupled to control components and/or driving components for the light sources.

7. The kit of claim 6, where the component bridge is spaced apart from the portions of the frame having reflector surfaces such that airflow is permitted between the component bridge and the portions of the frame having reflector surfaces.

8. The kit of claim 1, further comprising:
 a plurality of light-emitting-diodes (LEDs) coupled to the frame.

9. The kit of claim 8, further comprising:
 a processor coupled to the plurality of LEDs to control the operation of the LEDs.

10. The kit of claim 9, further comprising an LED dimming power supply in electrical communication with the plurality of LEDs, the LED dimming power supply configured to receive control signals from the processor.

11. The kit of claim 10, further comprising:
 one or more sensors coupled to the processor and configured to detect one or more events or environmental characteristics;

where the processor is configured to control the operation of the LEDs responsive to one or more events or environmental characteristics detected by the one or more sensors.

12. The kit of claim 11, where the environmental characteristics comprise at least an occupancy of an environment.

13. The kit of claim 11, where the one or more sensors comprise at least one camera configured to capture at least two images of the environment and the processor is configured to compare the at least two images to detect changes in the environment.

14. The kit of claim 11, where the one or more sensors comprise a motion sensor configured to capture data indicative of motion within the environment.

15. A method of retrofitting a light fixture into a rectangular troffer with first and second ends each having a vertical wall portion and a lower horizontal shelf portion extending inward from the vertical wall portion toward the other of the first and second ends, inner surfaces of the vertical wall portions separated by a first distance; the method comprising:
coupling a first mount to an inner surface of the vertical wall portion of the first end of the troffer; and
coupling a second mount to an inner surface of the vertical wall portion of the second end of the troffer,
removably coupling a first end of a frame for a light fixture to the first end of the troffer via a mounting member coupled to the frame and configured to extend beyond the first end of the frame to support the frame relative to the first end of the troffer; and
removably coupling a second end of a frame for a light fixture to the second end of the troffer via a mounting member coupled to the frame and configured to extend beyond the second end of the frame to support the frame relative to the second end of the troffer;
where each mount has a mounting surface facing the inner surface of the respective vertical wall portion and a protrusion extending to an inner end spaced from the mounting surface by a protrusion depth such that a distance between mounts on opposing ends of the troffer define a mount-opening length that is equal to or less than the first distance less twice the protrusion depth,
where the first mounting member is coupled to the fast end of the troffer via contact with the protrusion of the mount coupled to the first end of the troffer, and the second mounting member is coupled to the second end of the troffer via contact with the protrusion of the mount coupled to the second end of the troffer,
where the first mounting member is configured to contact the protrusion of one of the mounts coupled to the first end of the troffer to support the first end of the frame,
where the second mounting member is configured to contact the protrusion of another one of the mounts coupled to the second end of the troffer to support the second end of the frame,
where at least a portion of the second mounting member is configured to move between an extended first position and a retracted second position in which a distance between the first end of the frame and a distal end of the second mounting member is less than the mount-opening length,
where the second mounting member is biased toward the extended first position,
where the second mounting member comprises a spring with an upper end fixed to the exterior of the second end of the frame and a lower end movable relative to the second end of the frame,
where the lower end of the spring, extends through an aperture in an end wall of the frame into an interior of the frame such that a user can pull the lower end of the spring toward the first end of the frame to move the second mounting member to the retracted second position, and
where the frame is configured to support one or more light sources.

16. The method of claim 15, further comprising retrofitting a plurality of light fixtures into a respective plurality of rectangular troffers to form a set of retrofitted light fixtures, wherein the retrofitted light fixtures are configured with light emitting diodes as a light source.

17. The method of claim 16, further comprising:
identifying, in the set of retrofitted light fixtures, a primary retrofitted light fixture by detecting an occupant within range of the primary retrofitted light fixture;
identifying, in the set of retrofitted light fixtures, a first perimeter group of retrofitted light fixtures comprising a ring of retrofitted light fixtures around the primary retrofitted light fixture;
setting the light output of the primary retrofitted light fixture to a first level; and
setting the light output of the first perimeter group of retrofitted light fixtures to a second level that is lower than the first level.

18. The method of claim 16, further comprising:
identifying, responsive to an emergency, a first group of retrofitted light fixtures in the set of retrofitted light fixtures as being adjacent to an exit; and
setting the light output of the first group of retrofitted light fixtures to be a green color.

19. The method of claim 18, further comprising operating the light emitting diodes in a second group of retrofitted light fixtures in the set of retrofitted light fixtures in a sequential manner to indicate a direction toward the first group of retrofitted light fixtures.

* * * * *